(12) United States Patent
Nishii et al.

(10) Patent No.: US 10,365,979 B2
(45) Date of Patent: Jul. 30, 2019

(54) LOCKSTEPPED CPU SELECTION BASED ON FAILURE STATUS

(71) Applicant: Renesas Electronics Corporation, Tokyo (JP)

(72) Inventors: Osamu Nishii, Kanagawa (JP); Kiwamu Takada, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 119 days.

(21) Appl. No.: 15/645,002

(22) Filed: Jul. 10, 2017

(65) Prior Publication Data

US 2017/0308445 A1 Oct. 26, 2017

Related U.S. Application Data

(63) Continuation of application No. 14/801,825, filed on Jul. 17, 2015, now Pat. No. 9,734,023.

(30) Foreign Application Priority Data

Aug. 1, 2014 (JP) .................................. 2014-157653

(51) Int. Cl.
*G06F 11/16* (2006.01)
*G06F 11/10* (2006.01)
*G06F 11/14* (2006.01)

(52) U.S. Cl.
CPC ........ *G06F 11/165* (2013.01); *G06F 11/1004* (2013.01); *G06F 11/1645* (2013.01); *G06F 11/1695* (2013.01); *G06F 11/1405* (2013.01)

(58) Field of Classification Search
CPC ............... G06F 11/1608; G06F 11/1629–1654

USPC .................................. 714/10, 11, 45; 712/227
See application file for complete search history.

(56) References Cited

U.S. PATENT DOCUMENTS

| 6,948,092 B2 * | 9/2005 | Kondo ................ G06F 11/1441 714/12 |
| 7,065,672 B2 * | 6/2006 | Long ..................... G06F 11/181 712/11 |
| 7,290,169 B2 | 10/2007 | Safford et al. |
| 7,328,371 B1 | 2/2008 | Kalyanasundharam et al. |
| 2008/0244305 A1 | 10/2008 | Troppmann et al. |

(Continued)

FOREIGN PATENT DOCUMENTS

| JP | 2005-302020 A | 10/2005 |
| JP | 2012-073828 A | 4/2012 |

OTHER PUBLICATIONS

Office Action dated Dec. 5, 2017, in Japanese Patent Application No. 2014-157653.

*Primary Examiner* — Joseph R Kudirka
(74) *Attorney, Agent, or Firm* — Shapiro, Gabor and Rosenberger, PLLC

(57) ABSTRACT

Conventional semiconductor devices are problematic in that an operation cannot be continued in the event of a failure of one of CPU cores performing a lock step operation and, as a result, reliability cannot be improved. The semiconductor device according to the present invention includes a computing unit including a first CPU core and a second CPU core that perform a lock step operation, wherein the first CPU core and the second CPU core respectively diagnose failures of internal logic circuits, and a sequence control circuit switches the CPU core that outputs data to a shared resource, in the computing unit based on the diagnosed result.

12 Claims, 16 Drawing Sheets

(56) References Cited

U.S. PATENT DOCUMENTS

2011/0082970 A1* 4/2011 Rohleder ............ G06F 11/1666
                                                    711/104
2013/0007513 A1   1/2013 Traskov et al.

* cited by examiner

LOCKSTEPPED CPU SELECTION BASED ON FAILURE STATUS

CROSS-REFERENCE TO RELATED APPLICATIONS

This application is based upon and claims the benefit of priority from Japanese patent application No. 2014-157653, filed on Aug. 1, 2014, the disclosure of which is incorporated herein in its entirety by reference.

BACKGROUND

The present invention relates to a semiconductor device and to, for example, a semiconductor device that performs a lock step operation which causes a plurality of CPU cores to execute the same process in parallel.

In recent years, as a technique for increasing reliability in semiconductor devices, lock step processors are proposed which cause two central processing unit (CPU) cores to run in the same cycle and execute the same process. Techniques related to such lock step processors are disclosed in Japanese Unexamined Patent Application Publication No. 2012-73828 and United States Patent Publication No. 2008/0244305.

Japanese Unexamined Patent Application Publication No. 2012-73828 discloses an information processing device adopting a lock step system in which CPU modules of a plurality of systems including a processor and a memory with an error detection/correction function perform the same process in clock synchronization. In addition, in the information processing device according to Japanese Unexamined Patent Application Publication No. 2012-73828, a CPU module performs an error correction process by: storing first correction information that is generated when an error is detected from a memory of the system of the CPU module; transmitting the generated first correction information to a CPU module of another system; receiving second correction information that is generated when an error is detected from a memory of the CPU module of the other system; reading first correction information that is stored in a storage unit in accordance with a delay of reception of the second correction information from the CPU module of the other system; and synchronizing the second correction information and the first correction information with each other.

Furthermore, United States Patent Publication No. 2008/0244305 discloses a lock step processor of a delayed lock step system which alleviates timing constraints of a critical path by delaying output from one CPU core using a delay circuit and delaying input to another CPU core using a delay circuit.

SUMMARY

However, the processors disclosed in Japanese Unexamined Patent Application Publication No. 2012-73828 and United States Patent Publication No. 2008/0244305 are unable to continue operations in the event of a failure in hardware constituting a CPU core and therefore have a problem in that reliability cannot be sufficiently improved. Other objects and novel features will become apparent with reference to the following description and to the accompanying drawings.

According to an embodiment, a semiconductor device includes a computing unit including a first CPU core and a second CPU core that perform a lock step operation, wherein the first CPU core and the second CPU core respectively diagnose failures of internal logic circuits, and a sequence control circuit switches the CPU core that outputs data to a shared resource, in the computing unit based on the diagnose result.

Moreover, expressions in which the device in the embodiment described above is replaced by a method or a system, programs in which the device or a part of processes performed by the device is executed by a computer, and the like are also valid as aspects of the present invention.

According to the embodiment described above, a semiconductor device is capable of securing high reliability with respect to hardware failures.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
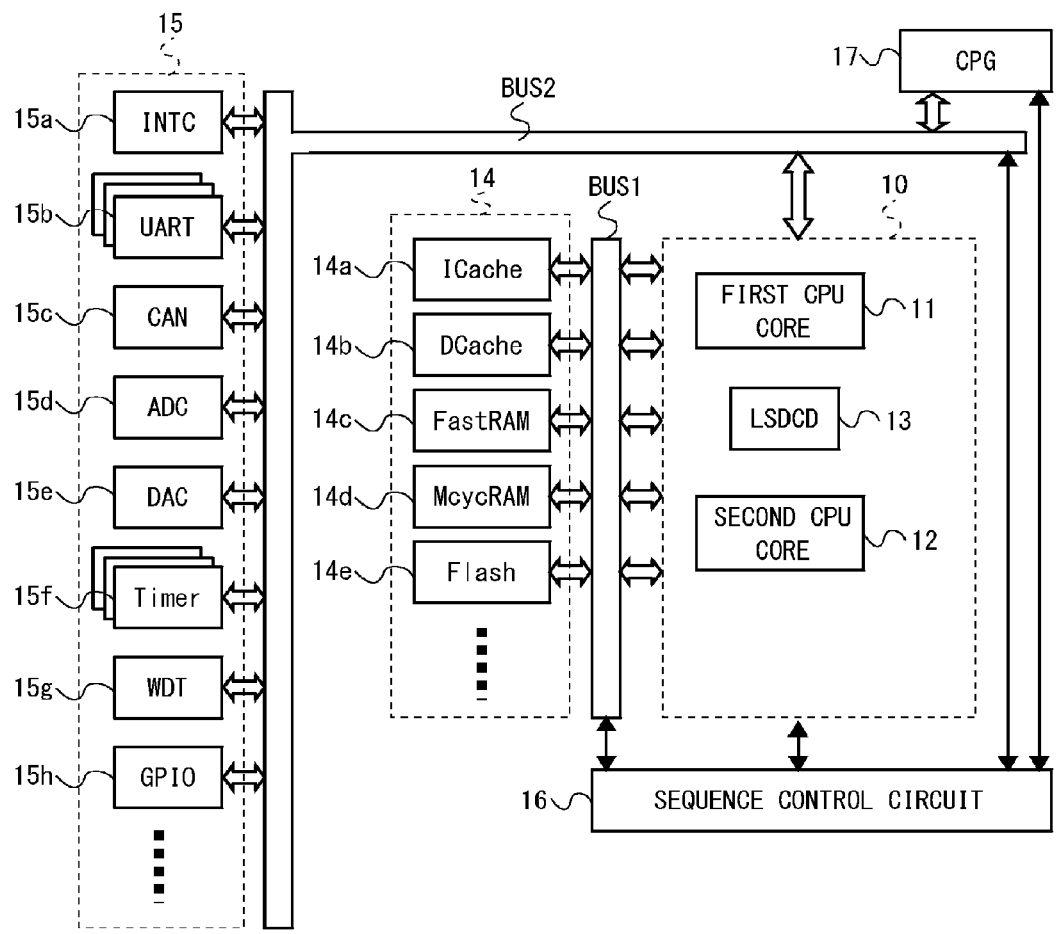
FIG. 1 is a block diagram of a semiconductor device according to a first embodiment.

The following description and the drawings include omissions and simplifications as deemed appropriate for the purpose of ensuring clarity. In addition, from a software perspective, the respective elements illustrated in the drawings as functional blocks that perform various processes are to be realized by a program loaded to a memory or the like. Therefore, it should be obvious to those skilled in the art that the functional blocks can be realized in various forms including hardware only, software only, or a combination of both and that the functional blocks are not limited to any particular form. Moreover, in the drawings, same elements are denoted by same reference characters and overlapping descriptions are omitted as necessary.

In addition, the program described above can be stored in, and supplied to a computer using, non-transitory computer readable media of various types. Non-transitory computer readable media include tangible storage media of various types. Examples of non-transitory computer readable media include magnetic storage media (for example, a flexible disk, a magnetic tape, and a hard disk drive), magneto-optic storage media (for example, a magneto-optic disk), a CD-read only memory (ROM), a CD-R, a CD-R/W, and semi-conductor memories (for example, a mask ROM, a programmable ROM (PROM), an erasable PROM (EPROM), a flash ROM, and a random access memory (RAM)). Alternatively, the program may be supplied to a computer in transitory computer readable media of various types. Examples of transitory computer readable media include electric signals, optical signals, and electromagnetic waves. Transitory computer readable media are capable of supplying the program to a computer via a wired communication path such as an electric wire and an optic fiber or via a wireless communication path.

FIG. 1 shows a block diagram of a semiconductor device 1 according to a first embodiment. As shown in FIG. 1, the semiconductor device 1 according to the first embodiment includes a computing unit 10, a shared memory 14, a peripheral circuit group 15, a sequence control circuit 16, and a clock generation circuit 17.

The computing unit 10 includes a first computing element (for example, a first CPU core 11), a second computing element (for example, a second CPU core 12), and a data logic circuit 13. The first CPU core 11 and the second CPU core 12 are computing elements that perform a lock step operation in which the same process is executed by multiplexing. In addition, while details will be provided later, the first CPU core 11 and the second CPU core 12 are equipped with a function for outputting diagnostic information indicating a presence or absence of a failure occurring in an internal logic circuit. The data logic circuit 13 is a logic circuit provided on a data input/output path to/from the first CPU core 11 and the second CPU core 12. Details of the data logic circuit 13 will also be provided later.

The shared memory 14 includes an instruction cache 14a, a data cache 14b, a high-speed RAM 14c, a multi-cycle RAM 14d, and a flash memory 14e. The shared memory 14 is one of the shared resources that are shared by the first CPU core 11 and the second CPU core 12. In addition, the memories described above are simply an example and the shared memory 14 may include only a part of the memories described above or may include a memory other than those described above.

The peripheral circuit group 15 includes an interrupt circuit 15a, a universal asynchronous receiver transmitter (UART) interface 15b, a controller area network (CAN) interface 15c, an analog-digital converter 15d, a digital-analog converter 15e, a timer 15f, a watchdog timer 15g, and a general purpose input/output (GPIO) interface 15h. The peripheral circuit group 15 is one of the shared resources. In addition, the peripheral circuits described above are simply an example and the peripheral circuit group 15 may include only a part of the peripheral circuits described above or may include a peripheral circuit other than those described above.

Moreover, the shared memory 14 and the peripheral circuit group 15 are both shared resources and at least one may be provided.

The sequence control circuit 16 outputs control signals for controlling operation sequences of the computing unit 10, the shared memory 14, the peripheral circuit group 15, and the clock generation circuit 17. Particularly, one of the features of the semiconductor device 1 according to the first embodiment is that the sequence control circuit 16 outputs a control signal which, instead of causing output data of a computing element for which an occurrence of a failure is diagnosed based on diagnostic information output by the first CPU core 11 and the second CPU core 12 to be output to a shared resource, causes output data of a normal computing element to be output to the shared resource. In addition, another feature of the semiconductor device 1 according to the first embodiment is that, when it is determined that a failure has occurred in a computing element based on diagnostic information, the sequence control circuit 16 outputs a control signal (for example, a cancellation signal) for instructing cancellation of write data to a shared resource. Details of operations of the semiconductor device 1 including an operation of the sequence control circuit 16 will be provided later.

The clock generation circuit 17 generates a clock signal that is used by the computing unit 10, the shared memory 14, the peripheral circuit group 15, and the sequence control circuit 16. In other words, each block provided in the semiconductor device 1 performs synchronous operation based on a clock signal generated by the clock generation circuit 17. Moreover, the semiconductor device 1 may include a circuit that operates based on a clock signal other than that generated by the clock generation circuit 17.

In addition, the semiconductor device 1 according to the first embodiment is configured such that the computing unit 10 and the shared memory 14 are connected to each other by a first bus BUS1 and the computing unit 10 and the peripheral circuit group 15 are connected to each other by a second bus BUS2. In the semiconductor device 1 according to the first embodiment, the sequence control circuit 16 and the shared memory 14 are connected to each other by the first bus BUS1 and the sequence control circuit 16 and the peripheral circuit group 15 are connected to each other by the second bus BUS2. In addition, the sequence control circuit 16 directly transmits and receives signals to and from the computing unit 10 and the clock generation circuit 17 without involving a bus.

Figure 2:
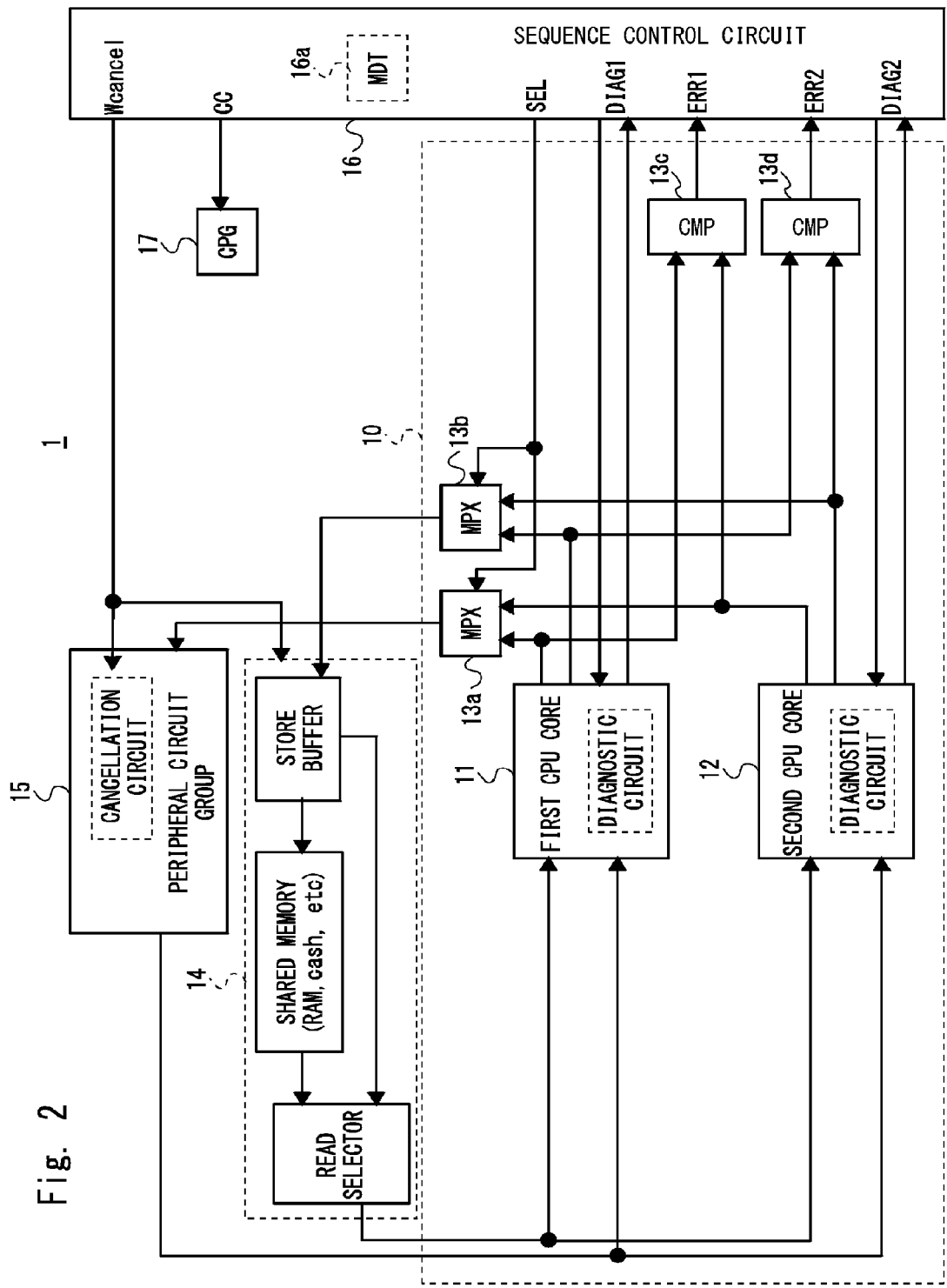
FIG. 2 is a detailed block diagram of a semiconductor device according to the first embodiment.

Since a feature of the semiconductor device 1 according to the first embodiment is in operations of the computing unit 10 and the sequence control circuit 16, a detailed block diagram of the computing unit 10 is shown in FIG. 2 and a detailed description of the computing unit 10 will be given with reference thereto.

In FIG. 2, buses connecting the respective blocks are omitted and only transmission paths of signals are shown. In addition, FIG. 2 offers a simplified view in which individual circuits are not shown as blocks included in the peripheral circuit group 15 and the shared memory 14. Furthermore, as shown in FIG. 2, the computing unit 10 according to the first embodiment includes selectors 13a and 13b and comparators 13c and 13d as the data logic circuit 13. Moreover, as shown in FIG. 2, the first CPU core 11 and the second CPU core 12 are respectively internally provided with diagnostic circuits.

The semiconductor device 1 according to the first embodiment uses circuits with the same configuration as the first CPU core 11 and the second CPU core 12. In addition, the first CPU core 11 and the second CPU core 12 perform a lock step operation in which the same process is performed in the same cycle. More specifically, depending on a process, the first CPU core 11 and the second CPU core 12 read an instruction or data from the shared memory 14 or the peripheral circuit group 15 and perform the process. Furthermore, when outputting a result of the process to the peripheral circuit group 15, the first CPU core 11 and the second CPU core 12 output the result of the process to the peripheral circuit group 15 via the selector 13a. Moreover, when outputting a result of the process to the shared memory 14, the first CPU core 11 and the second CPU core 12 output the result of the process to the shared memory 14 via the selector 13b. Whether the selectors 13a and 13b select a process result of the first CPU core 11 or a process result of the second CPU core 12 depends on a selection signal SEL that is output by the sequence control circuit 16. In an initial state, the sequence control circuit 116 outputs the selection signal SEL so that a process result of either one of the first CPU core 11 and the second CPU core 12 (for example, the first CPU core 11) is selected.

At this point, the computing unit 10 transmits process results of the first CPU core 11 and the second CPU core 12 to the selectors 13a and 13b as well as to the comparators 13c and 13d. The comparators 13c and 13d compare a process result of the first CPU core 11 with a process result of the second CPU core 12 and output an error signal indicating whether or not process results of the two CPU cores are consistent. For example, the comparator 13c sets an error signal ERR1 to a high level when the process results of the two CPU cores are consistent and sets the error signal ERR1 to a low level when the process results of the two CPU cores are inconsistent. In addition, the comparator 13d sets an error signal ERR2 to a high level when the process results of the two CPU cores are consistent and sets the error signal ERR2 to a low level when the process results of the two CPU cores are inconsistent.

Moreover, in the semiconductor device 1 according to the first embodiment, since a path for transmitting data to the shared memory 14 and a path for transmitting data to the peripheral circuit group 15 are separately provided, the computing unit 10 is provided with two selectors and two comparators. However, when there is only data transmission path to a shared resource, the computing unit 10 may include only one selector and one comparator.

In addition, the first CPU core 11 and the second CPU core 12 according to the first embodiment respectively output diagnostic information indicating a presence or absence of a failure occurring in an internal logic circuit. The diagnostic information is generated by diagnostic circuits provided inside the first CPU core 11 and the second CPU core 12. More specifically, the first CPU core 11 outputs diagnostic information DIAG1 from an internal diagnostic circuit and the second CPU core 12 outputs diagnostic information DIAG2 from an internal diagnostic circuit. Details of the diagnostic circuits will be provided later.

In addition, as shown in FIG. 2, the shared memory 14 includes a store buffer that temporarily stores output data that is output from the computing unit 10. The peripheral circuit group 15 includes a cancellation circuit that cancels a process related to output data that is output from the computing unit 10. Detailed configurations of these shared resources will be provided later.

The sequence control circuit 16 outputs the selection signal SEL which, instead of causing a selector to select output data of a computing element for which an occurrence of a failure is diagnosed based on diagnostic information, causes the selector to select output data of a normal computing element. In addition, in accordance with a determination that a failure has occurred in the computing element selected by a selector based on diagnostic information, the sequence control circuit 16 cancels data on the store buffer of the shared memory 14 and issues a cancellation instruction to the cancellation circuit in the peripheral circuit group 15. The cancellation instruction to a shared resource is issued by a cancellation signal Wcancel. Furthermore, the sequence control circuit 16 instructs the computing element in which a failure has occurred to stop operation, and instructs the normal computing element to perform a recovery process for recovering output data that has been lost due to the occurrence of the failure. The operation stop instruction and the recovery process start instruction are issued by diagnostic information DIAG1 that is output from the sequence control circuit 16 to the first CPU core 11 and by diagnostic information DIAG2 that is output from the sequence control circuit 16 to the second CPU core 12.

In accordance with the diagnostic information DIAG1 and DIAG2, the sequence control circuit 16 issues a cancellation instruction with respect to a shared resource and issues an operation stop instruction and a recovery process start instruction to the first CPU core 11 and the second CPU core 12. The sequence control circuit 16 performs these operations in response to recognizing that a difference has occurred between process results of the two CPU cores based on the error signals ERR1 and ERR2. Details of operations of the semiconductor device 1 including an operation of the sequence control circuit 16 will be provided later.

Figure 3:
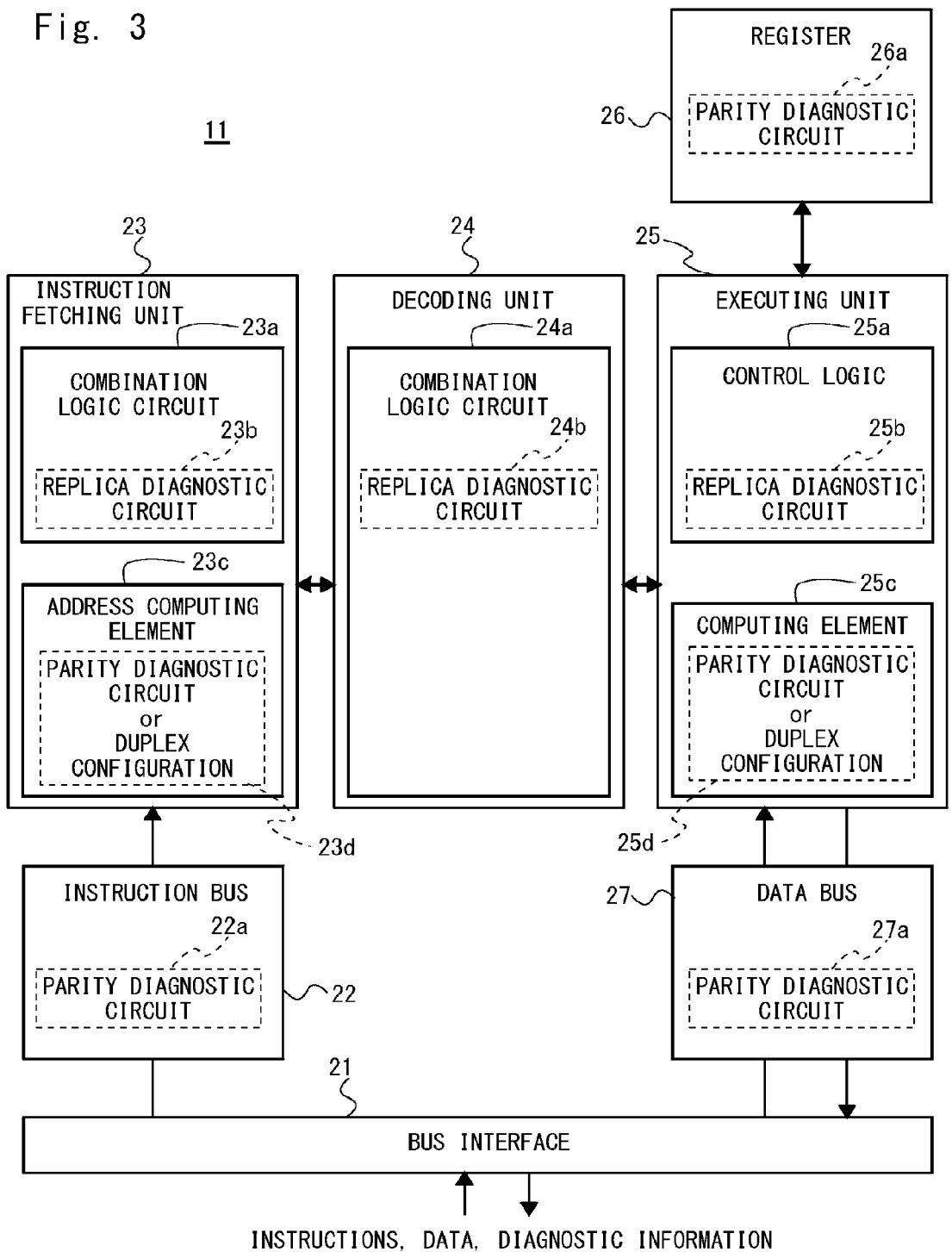
FIG. 3 is a block diagram of a CPU core according to the first embodiment.

Next, details of the CPU cores according to the first embodiment will be described. In this case, since the first CPU core 11 and the second CPU core 12 according to the first embodiment share the same configuration, the CPU cores according to the first embodiment will be described below using the first CPU core 11 as an example. FIG. 3 shows a block diagram of the first CPU core 11 according to the first embodiment. As shown in FIG. 3, the first CPU core 11 includes a bus interface 21, an instruction bus 22, an instruction fetching unit 23, a decoding unit 24, an executing unit 25, a register 26, and a data bus 27. A diagnostic circuit for diagnosing a fault of a logic circuit is provided in the instruction bus 22, the instruction fetching unit 23, the decoding unit 24, the executing unit 25, the register 26, and the data bus 27.

The bus interface 21 is an interface circuit for inputting and outputting instructions, data, diagnostic information, and the like to and from other blocks. The instruction bus 22 is a bus circuit for transmitting an instruction acquired via the bus interface 21 to the instruction fetching unit 23. The instruction bus 22 includes a parity diagnostic circuit 22a. The parity diagnostic circuit 22a determines a failure of a logic circuit of the instruction bus 22 by diagnosing data which propagates along a data path inside the instruction bus 22 according to parity. When an error is detected by this parity inspection, the parity diagnostic circuit 22a outputs diagnostic information indicating that a failure has occurred.

The instruction fetching unit 23 reads an instruction from the shared memory 14 or the like according to a value of a program counter (not shown). The instruction fetching unit 23 reads an instruction via the bus interface 21 and the instruction bus 22. In addition, the instruction fetching unit 23 includes a combination logic circuit 23a and an address computing element 23c. The combination logic circuit 23a is a logic circuit for performing specific reading processes. The address computing element 23c references a count value of the program counter and computes an address of a memory in which an instruction that is a read object is stored.

The combination logic circuit 23a includes a replica diagnostic circuit 23b. The replica diagnostic circuit 23b determines a failure of a logic circuit based on data which propagates along a data path of the combination logic circuit 23a and on replica data of the data. The replica diagnostic circuit 23b outputs diagnostic information indicating that a failure has occurred when the data which propagates along the data path of the combination logic circuit 23a and the replica data of the data are inconsistent with each other.

The address computing element 23c includes a diagnostic circuit 23d. For example, a parity diagnostic circuit or a circuit with a duplex configuration is conceivable as the diagnostic circuit 23d. A parity diagnostic circuit is suitable when the address computing element 23c does not change a count value of the program counter. When the address computing element 23c performs computation on the count value of the program counter, a circuit with a duplex configuration is suitable in which the same computation is executed using two circuits with the same configuration and two computation results are compared with each other.

The decoding unit 24 decodes an instruction acquired by the instruction fetching unit 23 and generates a computation instruction that instructs the executing unit 25 to perform a specific computation. The decoding unit 24 performs specific processes using a combination logic circuit 24a. The combination logic circuit 24a is provided with a replica diagnostic circuit 24b in addition to a combination logic circuit that performs specific processes. The replica diagnostic circuit 24b has the same function as the replica diagnostic circuit 23b and a description thereof will be omitted.

The executing unit 25 performs computation of data and the like in accordance with a computation instruction output by the decoding unit 24. The executing unit 25 includes a control logic circuit 25a and a computing element 25c. The control logic circuit 25a decides the computing element 25c to be used according to a computation instruction output by the decoding unit 24 and supplies data stored in the register 26 to the computing element to be used. The control logic circuit 25a includes a replica diagnostic circuit 25b. The replica diagnostic circuit 25b has the same function as the replica diagnostic circuit 23b and a description thereof will be omitted.

The computing element 25c performs a specific computation in accordance with a computation instruction output by the decoding unit 24. The computing element 25c includes a diagnostic circuit 25d. For example, a parity diagnostic circuit or a circuit with a duplex configuration is conceivable as the diagnostic circuit 25d. Which circuit type is to be adopted as the diagnostic circuit is selected according to a configuration of the computing element.

The register 26 stores data used by the executing unit 25 and a computation result obtained by a computation process performed by the executing unit 25. The register 26 includes a parity diagnostic circuit 26a. The parity diagnostic circuit 26a determines a failure of a logic circuit of the register 26 by diagnosing input/output data which propagates along a data path of the register 26 according to parity. When an error is detected by this parity inspection, the parity diagnostic circuit 26a outputs diagnostic information indicating that a failure has occurred.

The data bus 27 acquires specified data from a shared resource via the bus interface 21 when a load process occurs due to a computation result of the computing element 25c and stores the data in the register 26. In addition, when a store process occurs due to a computation result of the computing element 25c, the data bus 27 outputs specified data stored in the register 26 to a shared resource via the bus interface 21. A parity diagnostic circuit 27a determines a failure of a logic circuit of the data bus 27 by diagnosing data which propagates along a data path inside the data bus 27 according to parity. When an error is detected by this parity inspection, the parity diagnostic circuit 27a outputs diagnostic information indicating that a failure has occurred.

As described above, the CPU cores according to the first embodiment include certain diagnostic circuits. Moreover, while a diagnostic circuit is not provided in the bus interface 21 in the first CPU core 11 shown in FIG. 3, a diagnostic circuit of some kind may be proved in the bus interface 21. Since suitably designing a circuit configuration of a replica diagnostic circuit enables processes to be simplified and circuit size to be reduced, a detailed description will be provided below.

Figure 4:
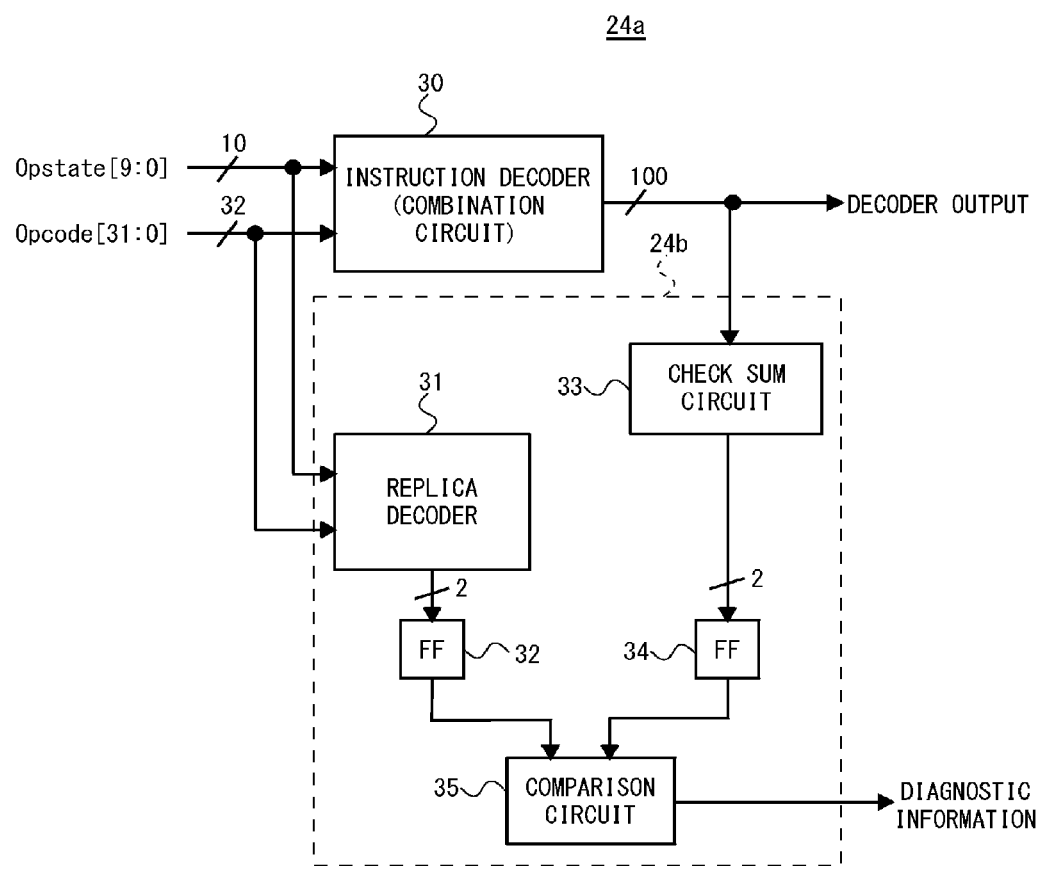
FIG. 4 is a block diagram of a replica diagnostic circuit that is provided in a combination logic circuit according to the first embodiment.

FIG. 4 shows a block diagram of a replica diagnostic circuit that is provided in the combination logic circuit 24a according to the first embodiment. As shown in FIG. 4, the combination logic circuit 24a includes an instruction decoder 30 and a replica diagnostic circuit 24b. The instruction decoder 30 is a combination circuit that constitutes a data path for decoding an instruction into a computation instruction. For example, the instruction decoder 30 outputs a 100-bit computation instruction from input of a 10-bit opstate and a 32-bit opcode.

The replica diagnostic circuit 24b includes a replica decoder 31, a check sum circuit 33, flip-flops 32 and 34, and a comparison circuit 35. The replica decoder 31 outputs a check sum computation result of a process result of the instruction decoder 30 with respect to the same input as the instruction decoder 30. The output of the replica decoder 31 is temporarily stored in the flip-flop 32. The check sum circuit 33 outputs the check sum computation result of the computation instruction that is output by the instruction decoder 30. The output of the check sum circuit 33 is temporarily stored in the flip-flop 34. The comparison circuit 35 compares a value stored in the flip-flop 32 and a value stored in the flip-flop 34 with each other, and when the two values are inconsistent, outputs diagnostic information indicating that a failure has occurred in the decoding unit 24.

As described above, by detecting a failure of the instruction decoder 30 based on a check sum result of a computation instruction that is output by the instruction decoder 30, the number of bits of values to be compared can be reduced in comparison to a case of simply multiplexing a configuration of the instruction decoder 30. In other words, by providing the replica diagnostic circuit 24b according to the first embodiment, circuit size can be reduced in comparison to a case of multiplexing the instruction decoder 30.

Next, a configuration of the peripheral circuit group 15 that is one of the shared resources will be described. The peripheral circuit group 15 includes a cancellation circuit that cancels writing of data to peripheral circuits included in the peripheral circuit group 15. Accordingly, FIG. 5 shows a block diagram of the peripheral circuit group 15 according to the first embodiment.

Figure 5:
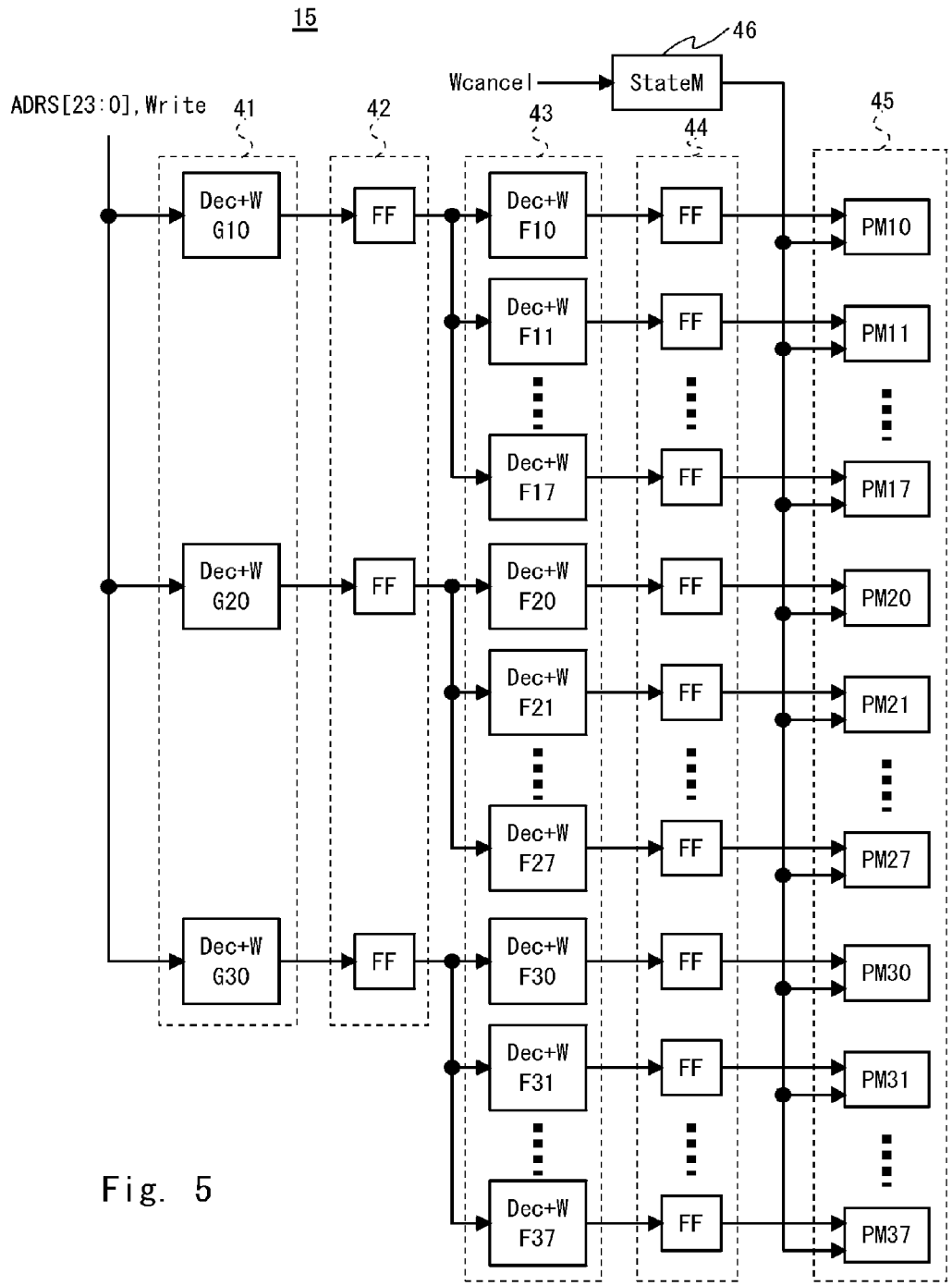
FIG. 5 is a block diagram of a peripheral circuit group according to the first embodiment.

As shown in FIG. 5, the peripheral circuit group 15 includes a group decoder group 41, a flip-flop group 42, an individual logic module decoder group 43, a flip-flop group 44, individual modules 45, and a state machine 46. In this case, the state machine 46 corresponds to a cancellation circuit. In addition, in FIG. 5, peripheral circuits are respectively represented by individual logic modules (PM10 to PM17, PM20 to PM27, and PM30 to PM37 in FIG. 5).

The group decoder group 41 includes group decoders G10, G20, and G30. The group decoder G10 is provided in correspondence with a first individual logic module group (for example, individual logic modules F10 to F17). The group decoder G20 is provided in correspondence with a second individual logic module group (for example, individual logic modules F20 to F27). The group decoder G30 is provided in correspondence with a third individual logic module group (for example, individual logic modules F30 to F37). The group decoders G10, G20, and G30 receive an address ADRS or the like and, based on a value of high-order bits of the address, determine whether a given instruction is for the individual logic module group corresponding to the decoder itself. When the group decoders G10, G20, and G30 determine that an input address or the like belongs to an individual logic module corresponding to the group decoder itself, the group decoders G10, G20, and G30 provide a low-order portion of the address and other control signals to the flip-flop group 42 in a subsequent stage.

In the example shown in FIG. 5, the flip-flop group 42 is provided between the group decoder group 41 and the individual logic module decoder group 43. The flip-flop group 42 is provided with a plurality of flip-flops corresponding to the group decoders. The plurality of flip-flops in the flip-flop group 42 temporarily store output from the group decoder group 41 and delay propagation of a signal from the group decoder group 41 to the individual logic module decoder group 43.

The individual logic module decoder group 43 includes individual logic module decoders F11 to F17, F20 to F27, and F30 to F37 which correspond to the individual logic modules. The individual logic module decoders further decode an address or the like that is output by a group decoder and output a more specific address or the like for controlling an individual logic module.

Moreover, in the example shown in FIG. 5, the flip-flop group 44 is provided between the individual logic module decoder group 43 and the individual modules 45. The flip-flop group 44 is provided with a plurality of flip-flops corresponding to the individual logic module decoders. The plurality of flip-flops in the flip-flop group 44 temporarily store output from the individual logic module decoder group 43 and delay propagation of a signal from the individual logic module decoder group 43 to the individual modules 45.

The state machine 46 outputs a control signal for prohibiting writing to the individual modules 45 in accordance with the cancellation signal Wcancel. In this case, in the peripheral circuit group 15, signals such as an address propagate to the individual modules 45 via the two-stage flip-flop groups. Therefore, in the peripheral circuit group 15, the cancellation signal Wcancel can cancel writing of data input to the peripheral circuit group 15 before 2 preceding clock cycles.

Next, a configuration of the shared memory 14 that is one of the shared resources will be described in detail. The shared memory 14 includes a store buffer which temporarily stores output data that is output from the computing unit 10 and is equipped with a function for canceling writing of data in the store buffer in accordance with the cancellation signal Wcancel. Memories with various forms can be used as the shared memory 14. In consideration thereof, FIGS. 6 and 7 show block diagrams of a plurality of memories that can be used as shared memories.

Figure 6:
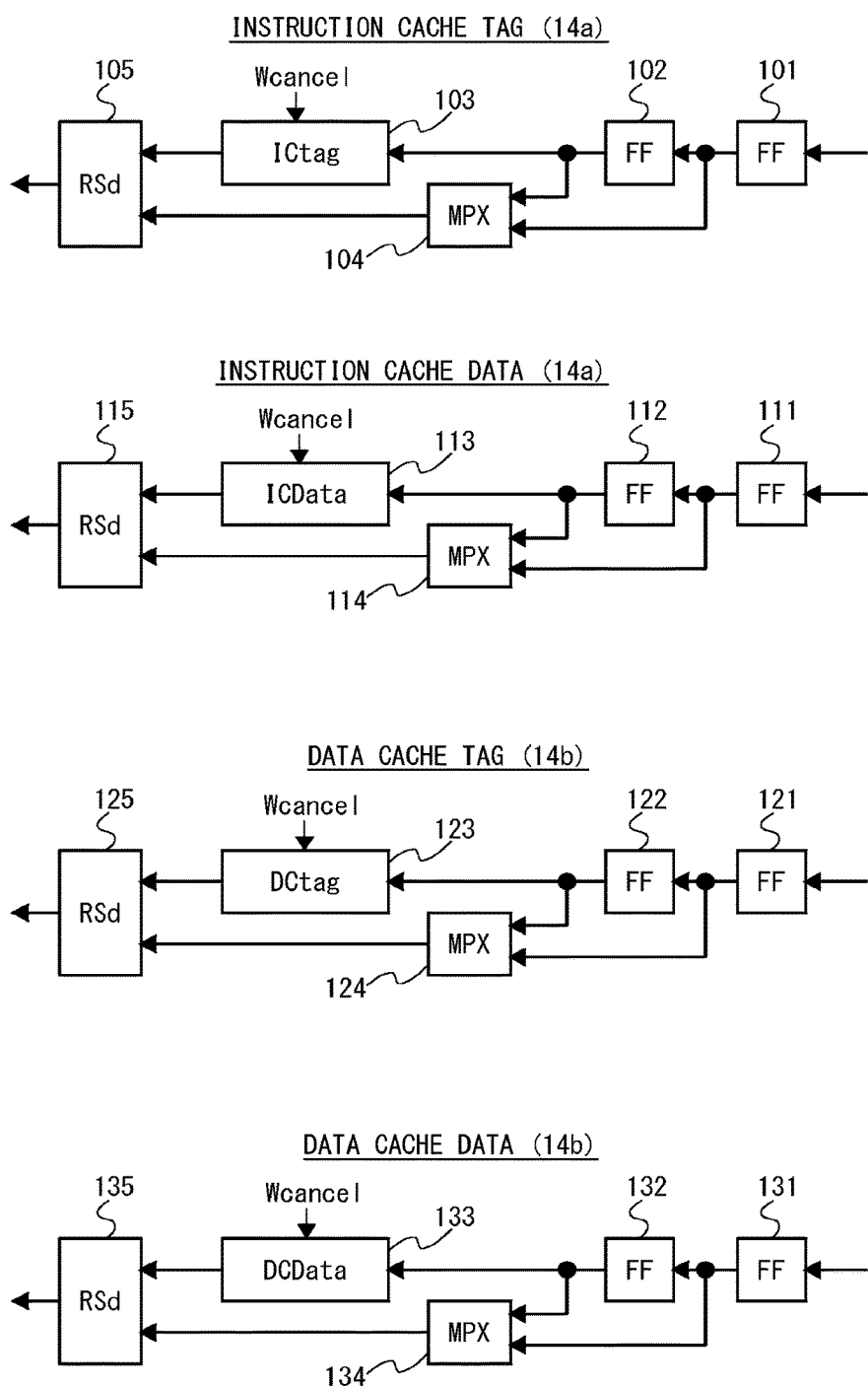
FIG. 6 is a block diagram of a shared memory according to the first embodiment.
Figure 7:
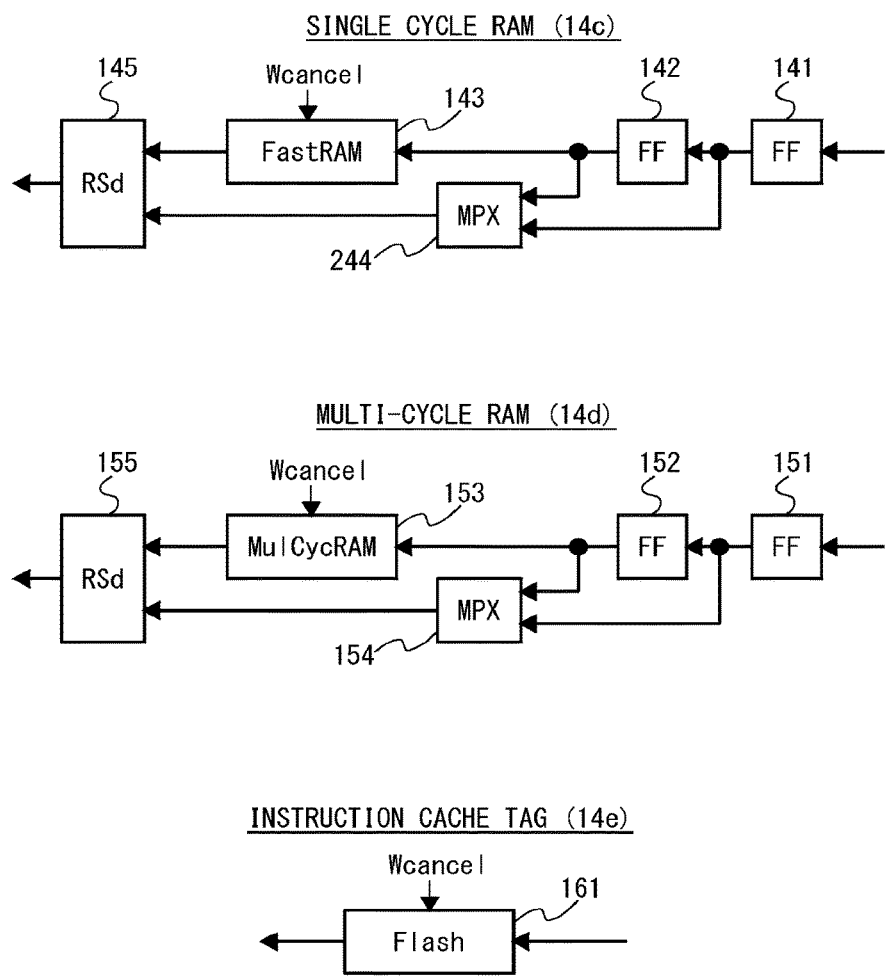
FIG. 7 is a block diagram of a shared memory according to the first embodiment.

FIG. 6 shows an instruction cache tag memory, an instruction cache data memory, a data cache tag memory, and a data cache data memory as shared memories. In this case, the instruction cache tag memory and the instruction cache data memory constitute the instruction cache 14a and instruction information is stored using the two memories. The data cache tag memory and the data cache data memory constitute the data cache 14b and data information is stored using the two memories.

The instruction cache tag memory includes flip-flops 101 and 102, an instruction cache tag memory 103, a selector 104, and a read selector 105. The instruction cache tag memory writes data into the instruction cache tag memory 103 via a two-stage flip-flop constituting the flip-flops 101 and 102. In addition, output of the flip-flops 101 and 102 is input to the selector 104. The read selector 105 selects and outputs one of an output of the instruction cache tag memory 103 and an output of the selector 104. In this case, the selector 104 and the read selector 105 switch which input is to be selected and output based on, for example, an instruction from the computing unit 10. In addition, due to the inclusion of the flip-flops 101 and 102, the instruction cache tag memory can delay writing of data to the instruction cache tag memory 103 by two clocks. In other words, the flip-flops 101 and 102 correspond to a store buffer. With the instruction cache tag memory shown in FIG. 6, data with an amount of delay that is less than 2 clocks can be read by having the read selector 105 select an output of the selector 104.

Since the instruction cache data memory, the data cache tag memory, and the data cache data memory have the same basic configuration as the instruction cache tag memory with the only difference being a memory part of the instruction cache tag memory respectively replaced with an instruction cache data memory 113, a data cache tag memory 123, and a data cache data memory 133, a detailed description thereof will be omitted.

FIG. 7 shows a high-speed RAM, a multi-cycle RAM, and a flash memory being used as shared memories. Since the high-speed RAM and the multi-cycle RAM only differ from the instruction cache tag memory shown in FIG. 6 in that a memory part of the instruction cache tag memory are respectively replaced with a high-speed RAM 143 and a multi-cycle RAM 153, a description thereof will be omitted. Unlike the other memories, the flash memory 161 does not include a flip-flop which functions as a store buffer and a read selector. This is because the flash memory 161 is a non-volatile memory and a delay is created when writing.

With the memories shown in FIGS. 6 and 7, the cancellation signal Wcancel is input to the memories in which data is stored. The memories prohibit writing of data that is input upon the cancellation signal Wcancel entering an enabled state. As a result, the shared memory 14 according to the first embodiment cancels writing of data.

Figure 8:
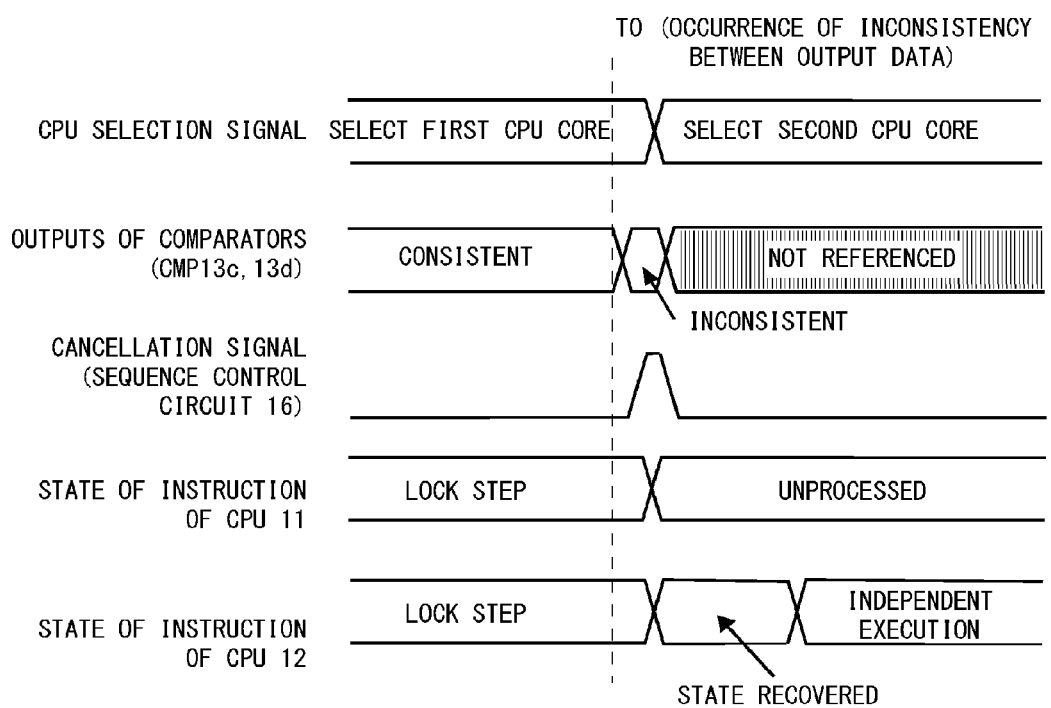
FIG. 8 is a timing chart for explaining an operation of a semiconductor device according to the first embodiment.

Next, an operation of the semiconductor device 1 according to the first embodiment will be described. To this end, FIG. 8 presents a timing chart showing an operation of the semiconductor device 1 according to the first embodiment. The example shown in FIG. 8 represents a case where the first CPU core 11 and the second CPU core 12 perform a lock step operation without incident until a timing TO, and a failure occurs in the first CPU core 11 at the timing TO and causes an inconsistency between the output data of the two CPUs.

As shown in FIG. 8, when there is no problem with the two CPUs, the output data of the two CPUs is consistent. Therefore, during a period until the timing TO, the sequence control circuit 16 selects the first CPU core 11 as a CPU that outputs data to a shared resource in accordance with an initial value. In addition, during the period until the timing T0, since the output data of the two CPUs is consistent, the comparators 13c and 13d indicate a state where input data is consistent.

Subsequently, when a failure occurs in the first CPU core 11 at the timing T0, an output of the comparator 13c or the comparator 13d changes to a state indicating that an inconsistency has occurred between the output data of the two CPUs. In addition, in accordance with the output of the comparators 13c and 13d, the sequence control circuit 16 outputs the cancellation signal Wcancel to the shared resource. Accordingly, in the semiconductor device 1, writing of output data of the computing unit 10 to the shared resource is canceled.

Furthermore, in accordance with the outputs of the comparators 13c and 13d, the sequence control circuit 16 confirms diagnostic information DIAG1 and DIAG2 that are output by the first CPU core 11 and the second CPU core 12.

In this confirmation process, when the sequence control circuit 16 confirms that a failure has occurred in the first CPU core 11, the sequence control circuit 16 switches the selection signal SEL to cause the selectors 13a and 13b to select output data that is output by the second CPU core 12. In addition, since the example shown in FIG. 8 represents a state where a failure has occurred in the first CPU core 11, the sequence control circuit 16 outputs the diagnostic information DIAG1 in order to place the first CPU core 11 in an unprocessed state (for example, a stopped state) and outputs the diagnostic information DIAG2 in order to instruct the second CPU core 12 to perform a recovery process.

In the recovery process, the second CPU core 12 once again executes a process from before a point in time when an error had occurred. While details will be provided later, when a failure occurs in a CPU core that outputs output data to be transmitted to a shared resource, a part of data created by a process performed by the CPU core is lost. However, by performing the recovery process, data that is lost due to the failure in the CPU core can be recovered. Once the recovery process is completed, the semiconductor device 1 continues the process by causing the second CPU core 12 to operate independently. Moreover, output values of the comparators 13c and 13d enter an unreferenced state after the sequence control circuit 16 outputs the cancellation signal Wcancel. In addition, methods of stopping the operation of the first CPU core 11 include stopping a clock signal from being supplied to the first CPU core 11 and stopping power from being supplied to the first CPU core 11.

While writing of data to a shared resource is canceled when a failure occurs in the first CPU core 11 or the second CPU core 12 in the semiconductor device 1 according to the first embodiment, an output timing of the cancellation signal Wcancel is important in order to cancel writing of erroneous data to the shared resource. In consideration thereof, a timing chart of a write cancellation process of data in the semiconductor device 1 is shown in FIG. 9.

Figure 9:
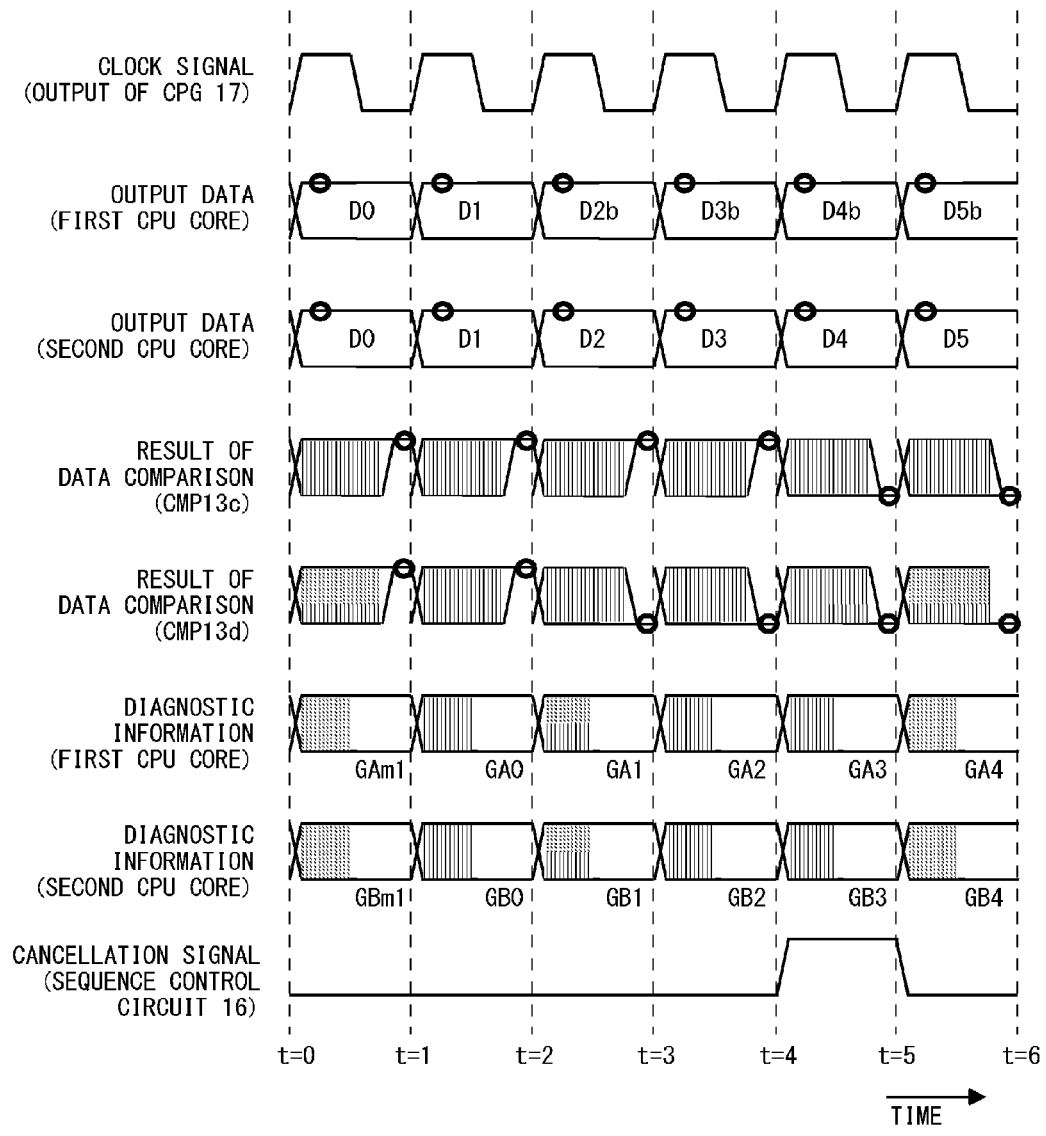
FIG. 9 is a timing chart for explaining an operation upon data cancellation of a semiconductor device according to the first embodiment.

Moreover, in FIG. 9, a data undetermined period until data is determined is shown hatched. In addition, in FIG. 9, a data fetching timing at which data output by each block is fetched by an output destination block is depicted by a circle.

In the example shown in FIG. 9, an inconsistency is created between the output data of the two CPUs which is transmitted to the shared memory 14 at a timing t2. In addition, in the example shown in FIG. 9, in the semiconductor device 1, output of the comparator 13d changes from a high level to a low level before a timing t3 arrives in accordance with the occurrence of the inconsistency in output data.

Subsequently, at a timing t4 that arrives two clock cycles after the timing t2, the sequence control circuit 16 changes the cancellation signal Wcancel to a high level. A period in which the cancellation signal Wcancel is set to a high level is 1 clock cycle. In addition, the timing at which the sequence control circuit 16 switches logic levels of the cancellation signal Wcancel arrives 2 clock cycles later when a logic level of an output of the comparator 13d changes to a low level because a delay occurs in a process performed by the sequence control circuit 16.

As shown in FIG. 9, output data that is output by the two CPUs at the timing t2 is fetched by the shared memory 14 soon after output. On the other hand, a determination result of the comparator 13d is fetched by the sequence control circuit 16 at a timing close to a timing t3 during a period from the timing t2 to the timing t3. Therefore, when the shared memory 14 does not include a store buffer, even if the sequence control circuit 16 immediately switches the cancellation signal Wcancel to a high level in accordance with an output of the comparator 13d, overwriting of data of the shared memory 14 cannot be prevented. However, since the shared memory 14 according to the first embodiment includes a store buffer, it takes 2 clock cycles to overwrite data in a memory part (for example, the instruction cache tag memory 103 or the instruction cache data memory 113) that actually stores data in the shared memory 14. In addition, the sequence control circuit 16 changes the cancellation signal Wcancel to a high level 2 clock cycles after the occurrence of output data determined to be inconsistent. Due to such a configuration, the semiconductor device 1 according to the first embodiment changes the cancellation signal Wcancel to a high level at a timing at which data is written to a memory part of the shared memory 14 to prevent loss of data stored in the memory part by being overwritten by erroneous data. Data that is lost by this write cancellation operation is recovered by a recovery process performed by a CPU core in which a failure has not occurred.

Moreover, delayed writing is also performed in the peripheral circuit group 15 in a similar manner to the shared memory 14. Therefore, even in the peripheral circuit group 15, writing of erroneous data can be canceled using the cancellation signal Wcancel in a similar manner to the shared memory 14.

In addition, as shown in FIG. 9, the diagnostic information DIAG1 of the first CPU core 11 and the diagnostic information DIAG2 of the second CPU core 12 are output for each clock cycle. The sequence control circuit 16 determines a CPU core in which a failure has occurred by referencing the diagnostic information DIAG1 and DIAG2 that are input after determination results output by the comparators 13c and 13d turn out to be inconsistent.

As described above, in the semiconductor device 1 according to the first embodiment, CPU cores that perform a lock step operation respectively have built-in diagnostic circuits which diagnose failures of internal logic circuits. In addition, when outputs of the CPU cores performing a lock step operation turn out to be inconsistent, by having the sequence control circuit 16 reference diagnostic information from the diagnostic circuits, the semiconductor device 1 according to the first embodiment can determine in which CPU core a failure has occurred.

Furthermore, in the semiconductor device 1 according to the first embodiment, by switching output data that is selected by the selectors 13a and 13b in accordance with the determination of a failure, an operation by a normal CPU core can be continued.

Moreover, in the semiconductor device 1 according to the first embodiment, writing of output data determined to be inconsistent by the comparators 13c and 13d to a shared resource can be canceled by the shared memory 14, the peripheral circuit group 15, and the sequence control circuit 16. Accordingly, in the semiconductor device 1 according to the first embodiment, data on a shared resource can be prevented from being destroyed by erroneous data. In addition, while a part of processed data is lost by canceling writing of erroneous data, in the semiconductor device 1 according to the first embodiment, a recovery process for recovering data that is lost as a result of writing cancelation of data is performed by a normal CPU core. As a result, with the semiconductor device 1 according to the first embodiment, even when a failure occurs in one of the two CPU cores that perform a lock step operation, destruction of processed data due to the failure can be prevented and operations can be continued.

Second Embodiment

In the second embodiment, a computing unit 50 that performs a delayed lock step operation is used as the computing unit 10. In a delayed lock step operation, the same instruction as processed by one CPU core is processed by another CPU core after a delay of several clock cycles. Therefore, although the same instruction is not strictly processed in the same clock cycle in a delayed lock step operation, a delayed lock step operation constitutes an aspect of a lock step operation in that the same instruction is processed by different CPU cores. With the delayed lock step operation, since a delay circuit that delays an instruction is provided on a path for transmitting an instruction to one CPU core, constraints of a critical path can be alleviated and a speed of operations by the computing unit 10 can be increased. Moreover, while a delayed lock step operation in which two CPU cores perform a lock step operation at a difference of 2 clock cycles is to be performed below, the difference in clock cycles between the two CPU cores is not limited to 2 clock cycles.

Figure 10:
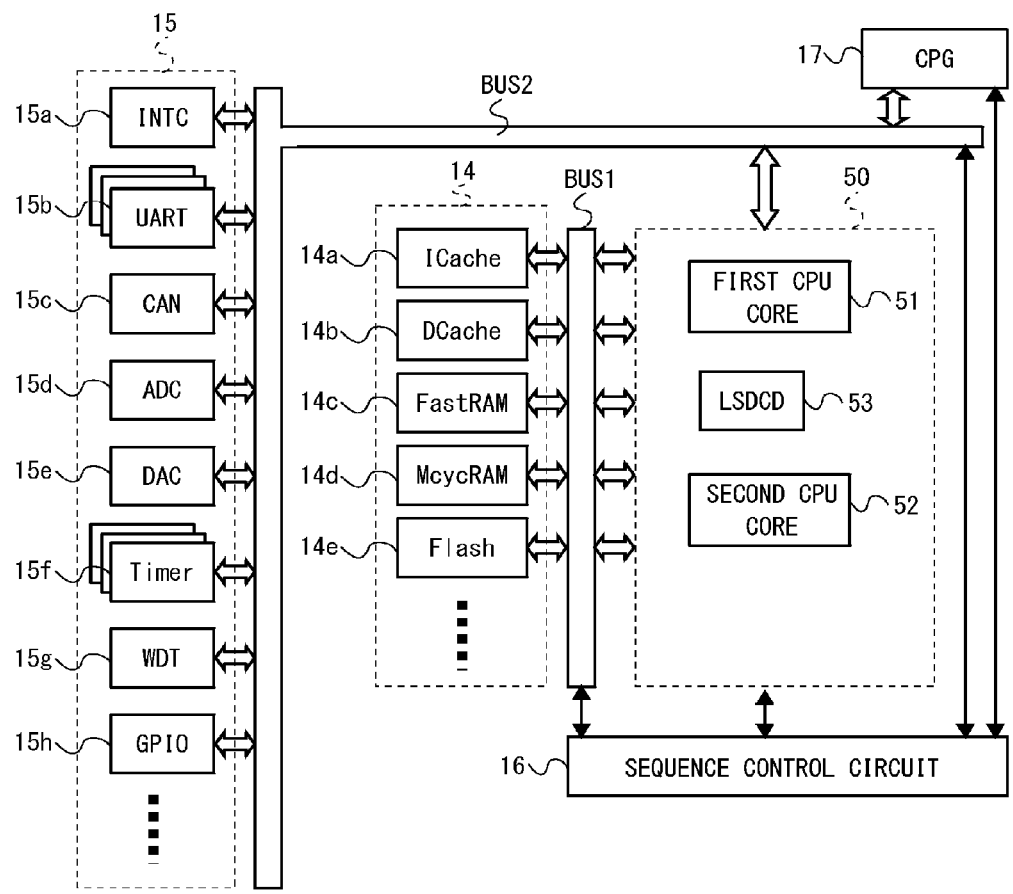
FIG. 10 is a block diagram of a semiconductor device according to a second embodiment.

In consideration thereof, FIG. 10 presents a block diagram of a semiconductor device 2 according to the second embodiment including the computing unit 50 according to the second embodiment. In the description of the second embodiment, the same components as those described in the first embodiment will be denoted by the same reference characters as used in the first embodiment and a description thereof will be omitted.

As shown in FIG. 10, the computing unit 50 according to the second embodiment replaces the first CPU core 11, the second CPU core 12, and the data logic circuit 13 in the computing unit 10 according to the first embodiment with a first CPU core 51, a second CPU core 52, and a data logic circuit 53. Accordingly, FIG. 11 shows a detailed block diagram of the computing unit 50 according to the second embodiment.

Figure 11:
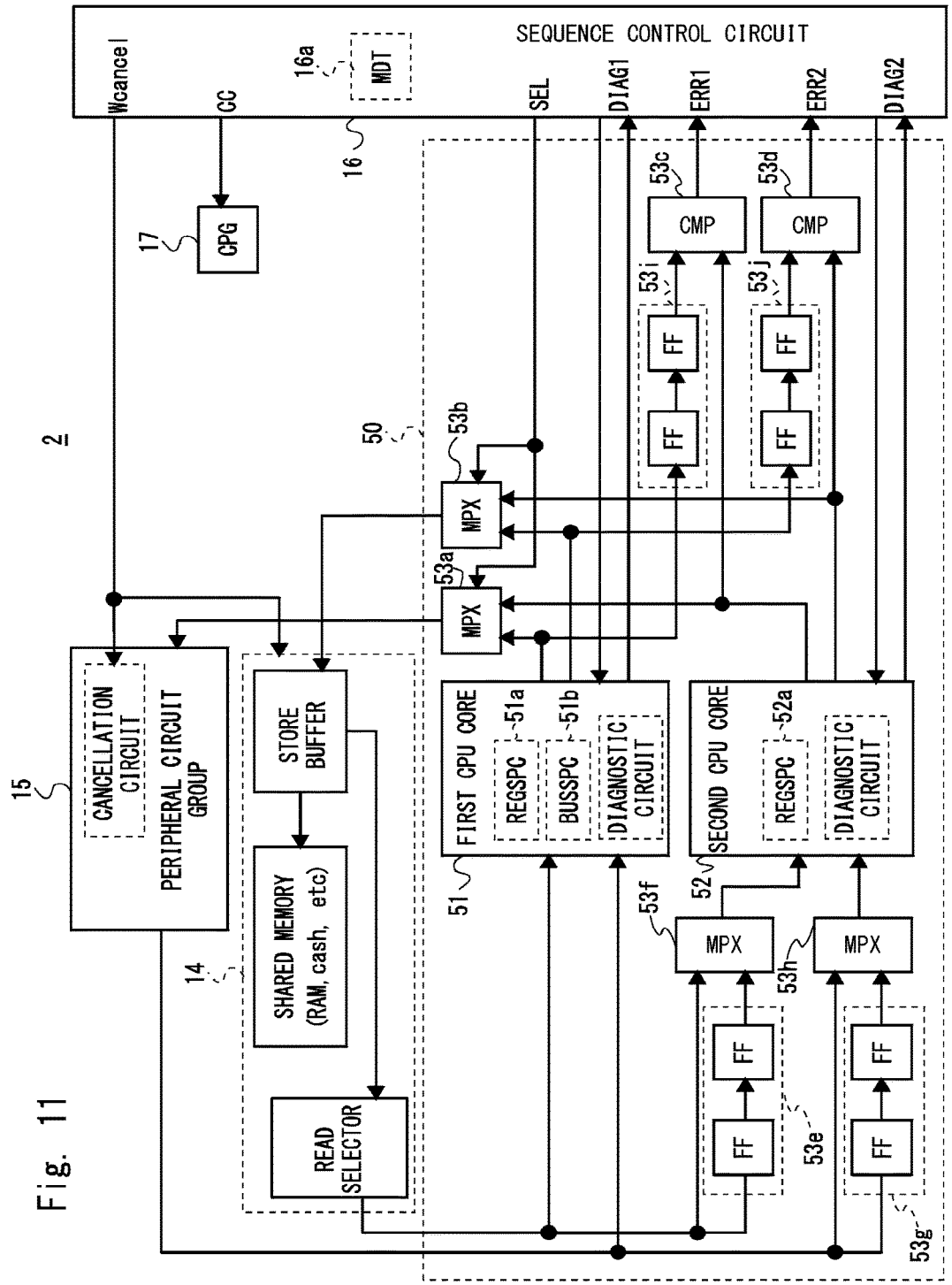
FIG. 11 is a detailed block diagram of a semiconductor device according to the second embodiment.

As shown in FIG. 11, the first CPU core 51 includes a first program counter (for example, a saved program counter 51a) and a second program counter (for example, a saved program counter 51b). Moreover, the first CPU core 51 similarly includes a diagnostic circuit that diagnoses a failure in an internal logic circuit. The second CPU core 52 includes a first program counter (for example, a saved program counter 52a).

The saved program counters 51a and 52a that are provided as the first program counter are program counters indicating a first unexecuted instruction regarding updating a register state inside each CPU core. When dynamic instruction sequences are divided into executed instruction sequences and unexecuted instruction sequences in exception handling or interrupt handling, the saved program counters 51a and 52a are referenced when restarting a process from a beginning of an unexecuted instruction sequence upon a return from an exception handler or an interrupt handler. In the present embodiment, since the first CPU core 51 and the second CPU core 52 operate at a cycle difference of 2 clocks, when operations of the CPU cores are stopped at a given clock cycle, contents of the saved program counter 51a and contents of the saved program counter 52a have values that differ from each other by 2 cycles.

The saved program counter 51b that is provided as the second program counter is a program counter that retains information regarding a shared bus interface. More specifically, the saved program counter 51a is a register indicating the same instruction as the saved program counter 51a or an instruction that is older by several instructions among dynamic instructions. The saved program counter 51b is updated when data input to the shared memory 14 goes through a store buffer in the shared memory 14 and is reliably written into a memory or a control register. In other words, when there is an instruction having generated unupdated write data, progress of count values of the saved program counter 51b lags behind progress of count values of the saved program counter 51a accordingly.

In this case, a condition that data is reliably written into a memory or a control register does not differ between the first CPU core 51 and the second CPU core 52 and is a common phenomenon. Therefore, it may seem that the saved program counter 51b doubles as a saved program counter with respect to a shared bus interface of the second CPU core 52. However, there are fine differences between the saved program counter 51b and a saved program counter with respect to a shared bus interface of the second CPU core 52. These differences will be described later with reference to actual examples.

In addition, as shown in FIG. 11, the computing unit 50 includes selectors 53a, 53b, 53f, and 53h, comparators 53c and 53d, and delay circuits 53e, 53g, 53i, and 53j as the data logic circuit 53. In this case, since the selectors 53a and 53b and the comparators 53c and 53d correspond to the selectors 13a and 13b and the comparators 13c and 13d, a description thereof will be omitted.

The delay circuits 53e and 53g function as a first delay circuit that delays an input timing of input data acquired by the second CPU core 52 from a shared resource to the first CPU core 51. More specifically, the delay circuits 53e and 53g are provided in the computing unit 50 in a mode described below.

The delay circuit 53e is provided on a path for transmitting data from the shared memory 14 to the second CPU core 52 and delays transmitted data by 2 clocks. The selector 53f selects and outputs one of data directly transmitted from the shared memory 14 and data transmitted via the delay circuit 53e as data transmitted from the shared memory 14. For example, when the computing unit 50 is performing a delayed lock step operation, the selector 53f outputs data transmitted via the delay circuit 53e to the second CPU core 52, and when the computing unit 50 is performing an independent operation of the second CPU core 52, the selector 53f selects data that is transmitted without involving the delay circuit 53e and outputs the data to the second CPU core 52. Which of the data is to be selected by the delay circuit 53e is controlled by the sequence control circuit 16.

The delay circuit 53g is provided on a path for transmitting data from the peripheral circuit group 15 to the second CPU core 52 and delays transmitted data by 2 clocks. The selector 53h selects and outputs one of data directly transmitted from the peripheral circuit group 15 and data transmitted via the delay circuit 53g as data transmitted from the peripheral circuit group 15. For example, when the computing unit 50 is performing a delayed lock step operation, the selector 53h outputs data transmitted via the delay circuit 53g to the second CPU core 52, and when the computing unit 50 is performing an independent operation of the second CPU core 52, the selector 53h selects data that is transmitted without involving the delay circuit 53g and outputs the data to the second CPU core 52. Which of the data is to be selected by the delay circuit 53g is controlled by the sequence control circuit 16.

The delay circuits 53i and 53j function as a second delay circuit that delays a timing at which the output data of the first CPU core 51 is input to the comparators 53c and 53d so as to come later than a timing at which the output data of the second CPU core 52 is input to the comparators 53c and 53d. Specifically, the delay circuits 53i and 53j are provided in the computing unit 50 in a mode described below.

The delay circuit 53i is provided on a path on which output data that is output to the shared memory 14 among output data that is output by the first CPU core 51 is transmitted to the comparator 53c. Moreover, a delay circuit is not provided on a path on which the output data of the second CPU core 52 is input to the comparator 53c. The delay circuit 53j is provided on a path on which output data that is output to the peripheral circuit group 15 among output data that is output by the first CPU core 51 is transmitted to the comparator 53d. Moreover, a delay circuit is not provided on a path on which the output data of the second CPU core 52 is input to the comparator 53d.

In addition, in the computing unit 50 according to the second embodiment, the delay circuits 53e, 53g, 53i, and 53j are constituted by flip-flops connected in series in two stages. The flip-flops operate based on clocks supplied to the first CPU core 51 and the second CPU core 52. In other words, the delay circuits 53e, 53g, 53i, and 53j delay input data by two clocks and transmit the delayed data to a circuit in a subsequent stage. Furthermore, in the semiconductor device 2 according to the second embodiment, an amount of delay by the first delay circuit (for example, the delay circuits 53e and 53g) and an amount of delay by the second delay circuit (for example, the delay circuits 53i and 53j) are the same.

As described above, in the computing unit 50 according to the second embodiment, the same instruction is executed while being delayed by 2 clocks. Therefore, with the computing unit 50 according to the second embodiment, data corresponding to a maximum of 4 previous clocks must be canceled in order to prevent erroneous data from being written into a shared resource. In consideration thereof, FIG. 12 presents a block diagram of a high-speed RAM that is one of the memories constituting the shared memory 14.

Figure 12:
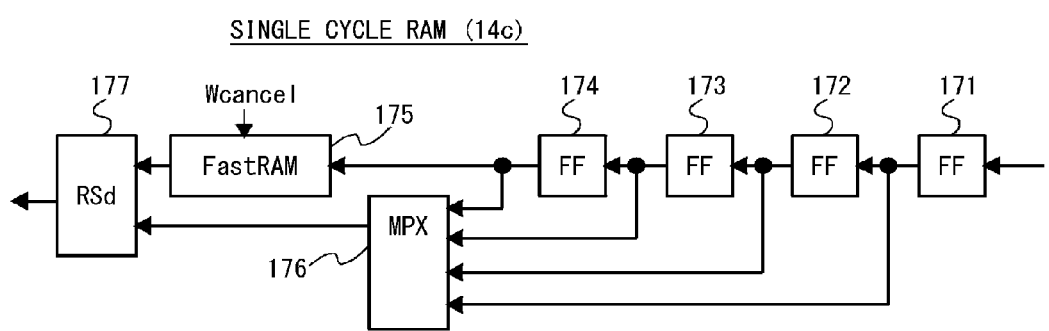
FIG. 12 is a block diagram of a shared memory according to the second embodiment.

As shown in FIG. 12, in the semiconductor device 2 according to the second embodiment, a four-stage flip-flop (flip-flops 171 to 174 in FIG. 12) is used as a store buffer of a supply memory. In addition, data is input to the multi-cycle RAM 175 via the four-stage flip-flop. Furthermore, the multi-cycle RAM 175 is also equipped with a function for canceling writing of data in accordance with the cancellation signal Wcancel. The selector 176 selects any one output of the four flip-flops and outputs the selected output.

Figure 13:
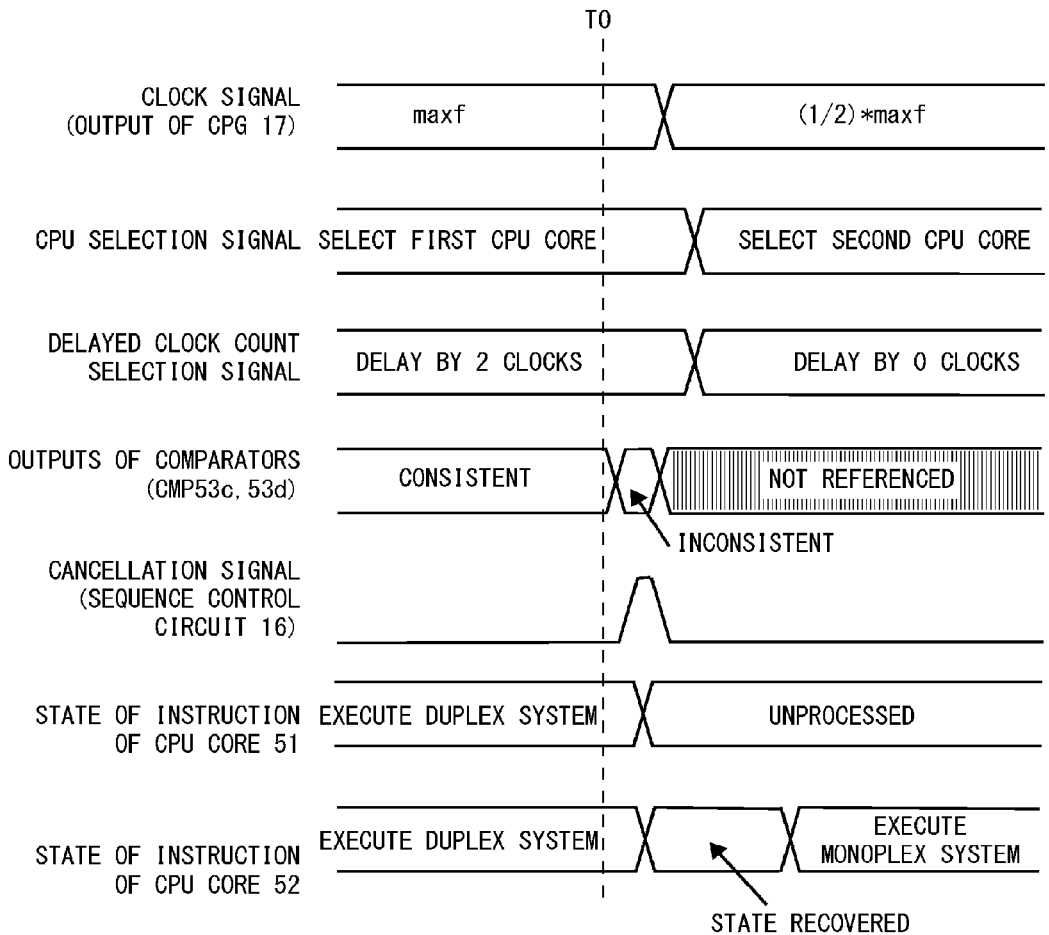
FIG. 13 is a timing chart for explaining an operation of a semiconductor device according to the second embodiment.

Next, an operation of the semiconductor device 2 according to the second embodiment will be described. To this end, FIG. 13 presents a timing chart showing an operation of the semiconductor device 2 according to the second embodiment. As shown in FIG. 13, in the semiconductor device 2 according to the second embodiment, until an inconsistency is created between the two CPU cores at a timing TO, a clock signal with a predetermined maximum frequency of maxf is supplied as a clock signal to be supplied to the computing unit 50 and the CPU cores are operated in a duplex system operation (for example, a delayed lock step operation). In addition, the semiconductor device 2 according to the second embodiment causes the selectors 53f and 53h to select outputs of the delay circuits 53e and 53g during a period in which the two CPU cores are outputting the same process result.

Subsequently, when an inconsistency between process results of the two CPU cores is detected at the timing TO, the semiconductor device 2 according to the second embodiment performs the following operation. First, the sequence control circuit 16 outputs the cancellation signal Wcancel and cancels writing of data to a shared resource. The sequence control circuit 16 instructs the first CPU core 51 to be placed in a stopped state and instructs the second CPU core 52 to perform a recovery process. The sequence control circuit 16 instructs the clock generation circuit 17 to change a frequency of a clock signal to ½. Subsequently, the sequence control circuit 16 instructs the selectors 53a and 53b to select output data of the second CPU core 52 as data to be supplied to a shared resource. Furthermore, the sequence control circuit 16 causes the selectors 53f and 53h to select data that is transmitted without involving the delay circuits 53e and 53g.

Figure 14:
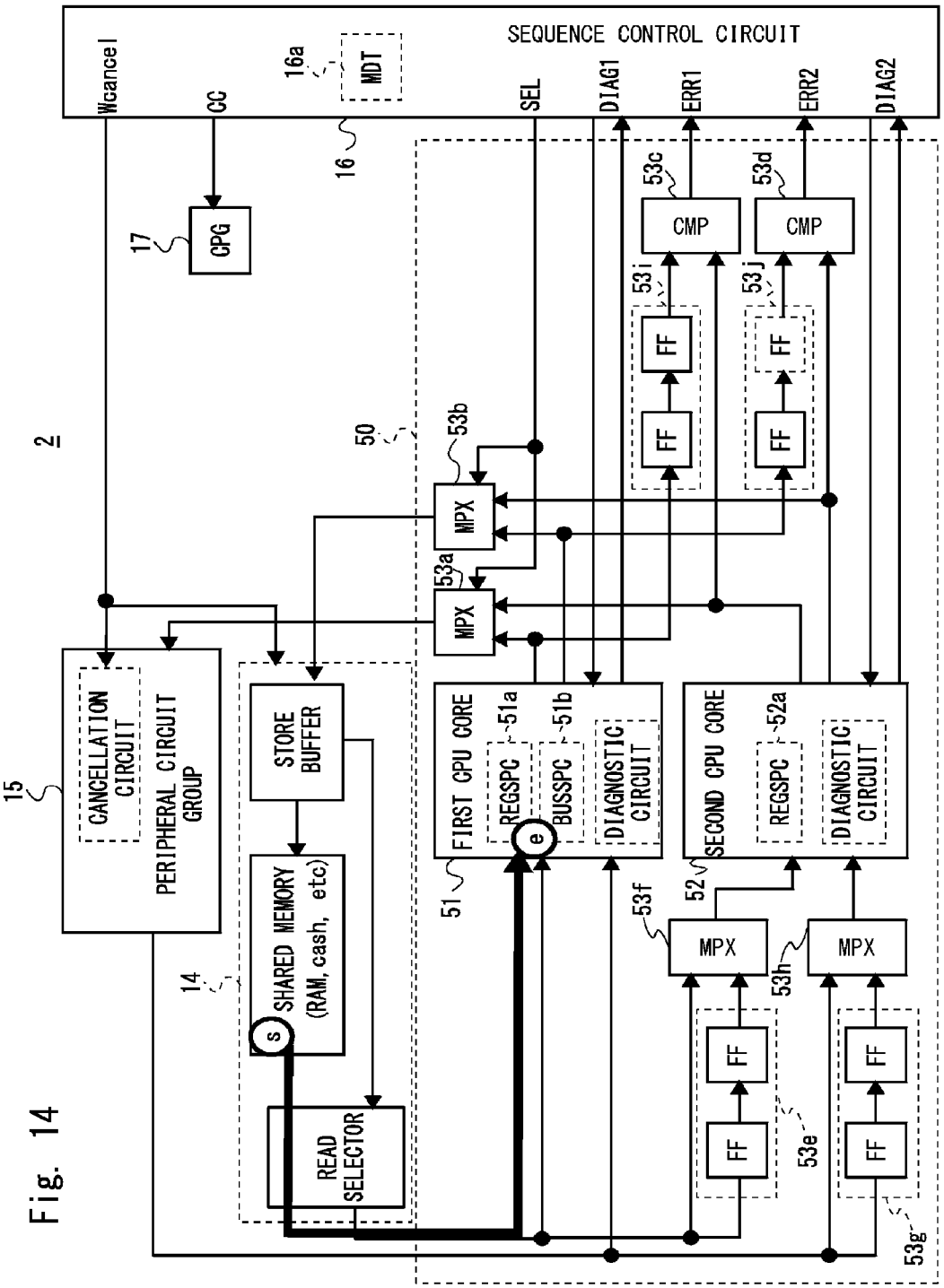
FIG. 14 is a block diagram for explaining an operation of a semiconductor device according to the second embodiment.
Figure 15:
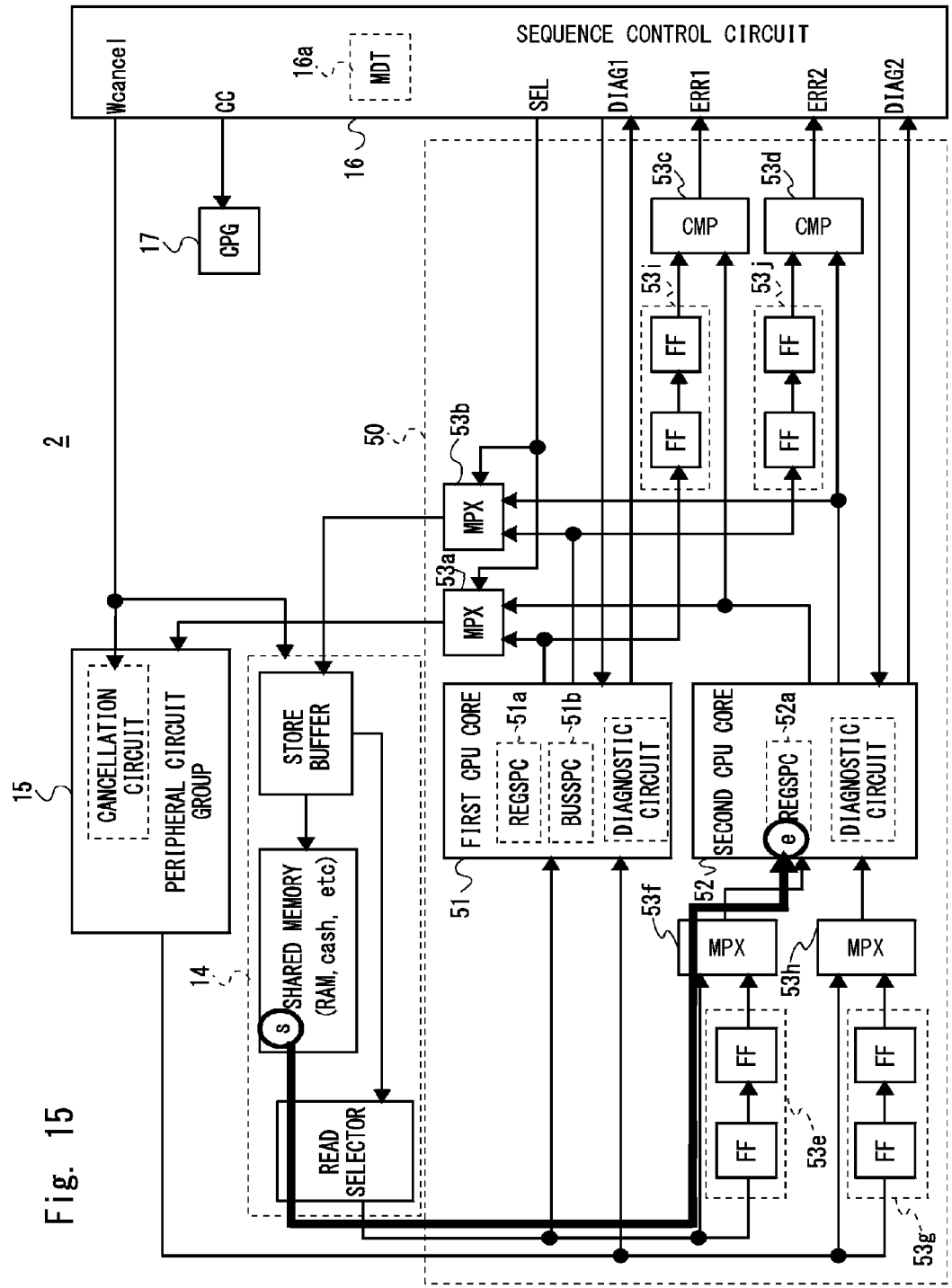
FIG. 15 is a block diagram for explaining an operation of a semiconductor device according to the second embodiment.

FIGS. 14 and 15 present diagrams that compare paths on which an instruction for generating data to be stored in a shared resource is transmitted from the shared memory 14 to the computing unit 50 before and after the timing TO shown in FIG. 12.

FIG. 14 is a diagram for explaining a path on which an instruction in a period preceding the timing TO shown in FIG. 12 is transmitted from the shared memory 14 to the computing unit 50. In addition, FIG. 15 is a diagram for explaining a path on which an instruction in a period after the timing TO shown in FIG. 12 is transmitted from the shared memory 14 to the computing unit 50.

As shown in FIG. 14, in a period preceding the timing TO, an instruction for generating data to be stored in a shared resource is transmitted from the shared memory 14 to the first CPU core 51. On the other hand, as shown in FIG. 15, in a period subsequent to the timing TO, an instruction for generating data to be stored in a shared resource is transmitted to the second CPU core 52 without involving the delay circuit 53e.

In FIGS. 14 and 15, critical paths when reading data from the shared memory 14 are depicted by solid lines. In addition, start points of the critical paths are denoted as s and end points thereof are denoted as e. A critical path refers to a path which must be used to transmit data to a circuit of a subsequent stage in one clock cycle. Therefore, with critical paths, there is a tendency that satisfying timing constraints becomes difficult as a physical distance between the start point s and the end point e increases. In consideration thereof, in the semiconductor device 2 according to the second embodiment, a delay circuit is provided in the second CPU core 52 that is located at a position with a longer physical distance from the shared memory 14 or the peripheral circuit group 15 to alleviate timing constraints. As a result, a path from a shared resource to the first CPU core 51 is set as a most strict critical path.

Furthermore, as shown in FIG. 15, when the second CPU core 52 is independently operated, data from a shared resource is supplied to the second CPU core 52 without involving a delay circuit in order to prevent operations from being delayed due to the addition of the delay circuit. In this case, the selectors 53f and 53h are inserted to a path from the shared resource to the second CPU core 52. Therefore, when the second CPU core 52 is independently operated, a logical distance of a path from the shared resource to the second CPU core 52 increases by an amount corresponding to the selectors 53f and 53h. In consideration thereof, in the semiconductor device 2 according to the second embodiment, a frequency of a clock signal to be supplied to the computing unit 50 is set to ½. Accordingly, timing constraints of a critical path caused by increases in logical distance and physical distance are alleviated.

As described above, with the semiconductor device 2 according to the second embodiment, when an inconsistency occurs between process results of the two CPU cores, an operation is switched to the second CPU core 52 which processes the same instruction as the first CPU core 51 at a delay of 2 clocks from the first CPU core 51. Therefore, with a shared resource according to the second embodiment, a write operation of 2 previous clocks must be further canceled as compared to the first semiconductor device 1 according to the first embodiment. In consideration thereof, as shown in FIG. 12, the semiconductor device 2 according to the second embodiment includes a delay circuit that creates a delay in a shared resource which is 2 clocks longer than the delay in a shared resource according to the first embodiment. Therefore, with the semiconductor device 2 according to the second embodiment, a write operation of 2 previous clocks can be further canceled as compared to the first semiconductor device 1 according to the first embodiment.

In addition, in the semiconductor device 2 according to the second embodiment, since a delayed lock step operation of 2 clocks is performed, a process for determining to which instruction a process result has been written into a shared resource in a recovery process becomes more complicated than in the semiconductor device 1 according to the first embodiment. In consideration thereof, in the second embodiment, the saved program counters 51a, 51b, and 52a are provided. Herein after, the saved program counter 51a will be referred to as REGSPC 51a, the saved program counter 51b will be referred to as BUSSPC 51b, and the saved program counter 52a will be referred to as REGSPC 52a.

Figure 16:
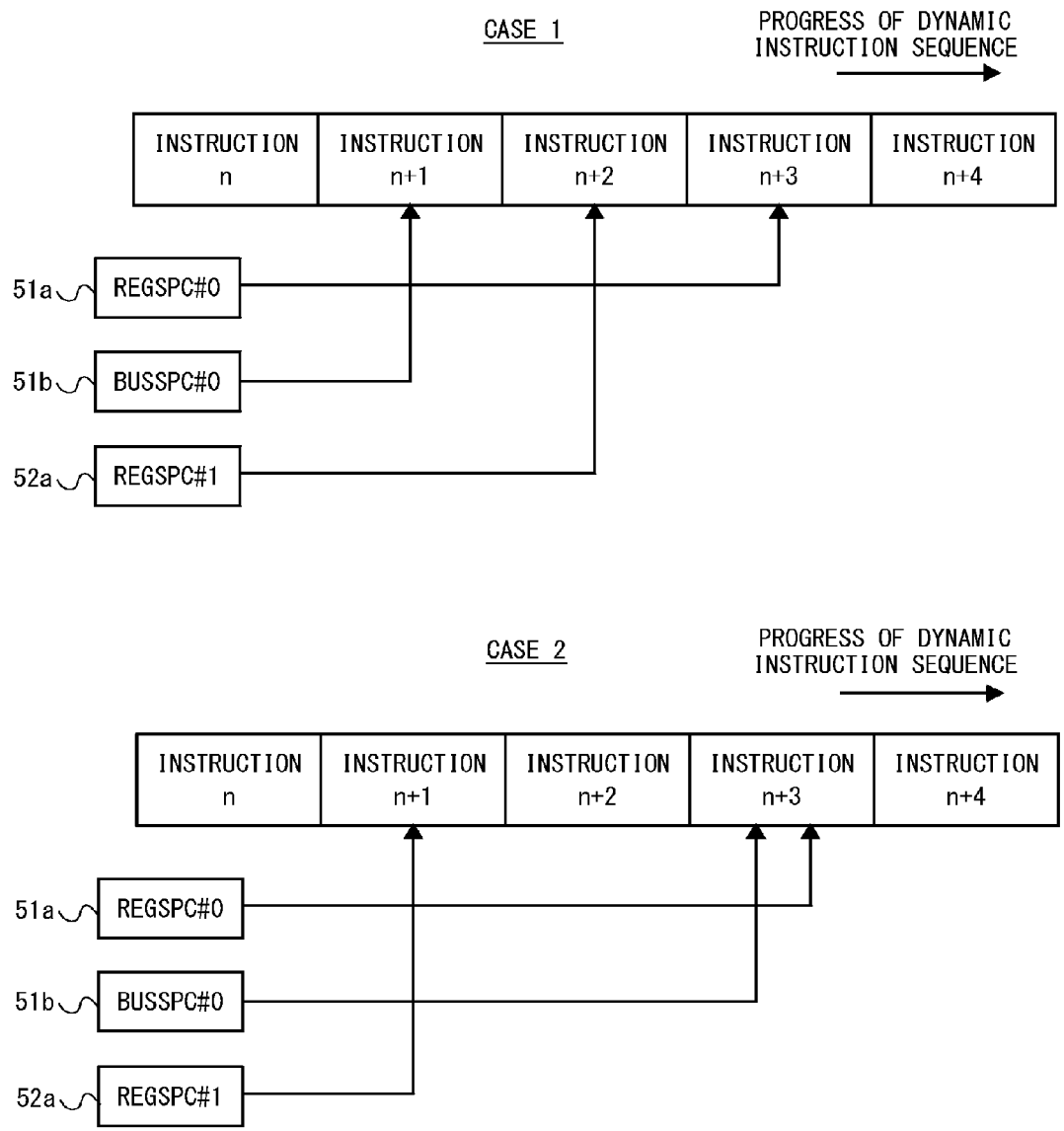
FIG. 16 is a timing chart for explaining a state of a register after write cancellation in a semiconductor device according to the second embodiment.

A recovery process using REGSPC 51a, BUSSPC 51b, and REGSPC 52a will now be described. FIG. 16 shows two cases of a recovery process using REGSPC 51a, BUSSPC 51b, and REGSPC 52a. Moreover, in FIG. 16, instructions n, n+1, n+2, . . . represent a dynamic instruction sequence that is chronologically executed by the CPU cores instead of an instruction sequence arranged on a memory.

In case 1 shown in FIG. 16, REGSPC 51a in the first CPU core 51 indicates an instruction n+3, BUSSPC 51b in the first CPU core 51 indicates an instruction n+1, and REGSPC 52a in the second CPU core 52 indicates an instruction n+2. In other words, case 1 represents a state where the first CPU core 51 has executed instructions up to n+2. In addition, case 1 shows that writing of process results to a shared resource has been performed up to a process result in a state where instructions up to n have been executed after write cancellation.

Furthermore, when case 1 is switched to an independent operation of the second CPU core 52 due to an occurrence of a failure in the first CPU core 51, a difference corresponding to one instruction is created between a value indicated by BUSSPC 51b and a value indicated by REGSPC 52a. A recovery process in case 1 is performed as follows.

In case 1, values indicated by BUSSPC 51b in the first CPU core 51 and REGSPC 52a in the second CPU core 52 differ from one another by one instruction. In other words, in case 1, with respect to the instruction n+1 indicated by BUSSPC 51b in the first CPU core 51, a register state in the first CPU core 51 has been updated but writing to a shared resource has not been completed. Therefore, in case 1, writing of one instruction of the instruction n+1 is executed by software using a software handler that is dedicated to updating the second CPU core 52. For example, in a case of an instruction for performing a memory store and also updating a register such as a push instruction, case 1 represents an example where only a memory store operation is analyzed and executed by software.

Case 2 shown in FIG. 16 represents an example where REGSPC 51a and BUSSPC 51b in the first CPU core 51 both indicate the instruction n+3 and REGSPC 52a in the second CPU core 52 indicates the instruction n+1. Case 2 describes a state where an execution time of an instruction that is being executed is longer than a write delay of the store buffer. For example, the state of case 2 occurs when the CPU cores execute a division instruction that requires a period of 10 clocks or longer to execute.

Although there is a difference between a value indicated by BUSSPC 51b in the first CPU core 51 and a value indicated by REGSPC 52a in the second CPU core 52 in case 2 in a similar manner to case 1 described above, a recovery process of case 2 differs from that of case 1.

Specifically, as a state of a register, when there is a memory store instruction among instructions n+1 and n+2, an operation by BUSSPC 51b in the first CPU core 51 takes place before REGSPC 52a in the second CPU core 52. Therefore, if the second CPU core 52 performs a process reflecting the value indicated by BUSSPC 51b in the first CPU core 51 as in case 1, a contradiction occurs in a definition of an instruction state of the second CPU core 52. In consideration thereof, case 2 does not require a recovery process such as that performed in case 1. In addition, even when there is no memory store instruction among instructions n+1 and n+2, by restarting execution of instructions from the instruction n+1 by the second CPU core 52, excess or deficiency of instruction processes is not caused by switching the CPU core that outputs data to a shared resource from the first CPU core 51 to the second CPU core 52. This is another reason that case 2 does not require a recovery process such as that performed in case 1.

As shown in FIG. 16, with the semiconductor device 2 according to the second embodiment, recovery processes when switching the CPU core to output data to a shared resource change depending on an instruction state of the first CPU core 51. Therefore, for example, what kind of recovery process is to be performed is decided by the sequence control circuit 16 by referencing states of registers of the first CPU core 51 and the second CPU core 52.

As described above, even in the semiconductor device 2 according to the second embodiment, each CPU core includes a diagnostic circuit and an operation of the computing unit 50 is switched based on diagnostic information generated by the diagnostic circuit. Accordingly, even in the semiconductor device 2 according to the second embodiment, an operation can be continued even when a failure occurs in one CPU core in a similar manner to the semiconductor device 1 according to the first embodiment.

In addition, in the second embodiment, a delayed lock step operation is performed in which the second CPU core 52 is operated at a clock cycle that is delayed from the first CPU core 51. To this end, the semiconductor device 2 according to the second embodiment includes a component (for example, a delay circuit, a saved program counter, or the like) which, when a failure occurs in the first CPU core 51, absorbs a difference between clock cycles at which the two CPU cores execute the same instruction and switches operations to the second CPU core 52. As a result, the semiconductor device 2 according to the second embodiment can improve reliability while performing a delayed lock step operation. In addition, by performing a delayed lock step operation, the semiconductor device 2 according to the second embodiment can increase a frequency of a clock that is used for an operation and achieve high processing capacity.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device, comprising:
   a first central processing unit (first CPU) and a second central processing unit (second CPU) that perform a lock step operation;
   a first selector that selects one of the first CPU and the second CPU;
   a store buffer that stores output data from the selected CPU;
   a memory that stores output data from the store buffer; and
   a read selector that selects one of the memory and the store buffer based on an instruction from one of the first CPU and the second CPU,
   wherein when the first selector selects the first CPU and the first CPU is in a failure status, the memory inhibits storing the output data from the store buffer and the first selector selects the second CPU.

2. The semiconductor device according to claim 1, wherein the store buffer selects one of a first delay and a second delay, and outputs data from the selected CPU with the selected delay.

3. The semiconductor device according to claim 2,
   wherein the store buffer comprises a first flip-flop, a second flip-flop, and a second selector, the second flip-flop disposed between the first flip-flop and the memory, and
   wherein the second selector selects one of the first flip-flop and the second flip-flop.

4. The semiconductor device according to claim 1, wherein the memory comprises a cache memory.

5. The semiconductor device according to claim 1, wherein the memory comprises a random access memory (RAM).

6. The semiconductor device according to claim 1, wherein the store buffer comprises multi-stage flip-flops.

7. A method of executing a process on lock step processors, the method comprising the steps of:
   performing a lock step operation by a first central processing unit (first CPU) and a second central processing unit (second CPU);
   selecting one of the first CPU and the second CPU;
   storing output data from the selected CPU to a store buffer circuit;
   storing output data from the store buffer circuit to a memory; and
   selecting one of the memory and the store buffer circuit based on an instruction from one of the first CPU and the second CPU,
   wherein when the first CPU is selected and the first CPU is in a failure status, the memory inhibits storing the output data from the store buffer and the second CPU is selected.

8. The method of claim 7, wherein the store buffer circuit selects one of a first delay and a second delay, and outputs data from the selected CPU with the selected delay.

9. The method of claim 8,
   wherein the store buffer circuit comprises a first flip-flop, a second flip-flop, and a selector circuit, the second flip-flop disposed between the first flip-flop and the memory, and
   wherein the selector selects one of the first flip-flop and the second flip-flop.

10. The method of claim 7, wherein the memory comprises a cache memory.

11. The method of claim 7, wherein the memory comprises a random access memory (RAM).

12. The method of claim 7, wherein the store buffer circuit comprises multi-stage flip-flops.

* * * * *